US012786188B2

(12) United States Patent
Murugaiah

(10) Patent No.: US 12,786,188 B2
(45) Date of Patent: Nov. 3, 2026

(54) MULTIMODAL AI AGENT WITH DYNAMIC PERSONA ADAPTATION AND COMPLIANCE ENFORCEMENT

(71) Applicant: MAAYU INC., Ashburn, VA (US)

(72) Inventor: Prabakaran Murugaiah, Ashburn, VA (US)

(73) Assignee: MAAYU INC., Ashburn, VA (US)

( * ) Notice: Subject to any disclaimer, the term of this patent is extended or adjusted under 35 U.S.C. 154(b) by 0 days.

(21) Appl. No.: 19/442,339

(22) Filed: Jan. 7, 2026

(65) Prior Publication Data

US 2026/0222404 A1 Jul. 30, 2026

Related U.S. Application Data

(60) Provisional application No. 63/742,528, filed on Jan. 7, 2025.

(51) Int. Cl.
*H04L 9/40* (2022.01)

(52) U.S. Cl.
CPC ........ *H04L 63/0861* (2013.01); *H04L 63/105* (2013.01)

(58) Field of Classification Search
CPC .......................... H04L 63/0861; H04L 63/105
See application file for complete search history.

(56) References Cited

U.S. PATENT DOCUMENTS

| | | | | |
|---|---|---|---|---|
| 10,650,824 | B1 | 5/2020 | Kesharaju et al. | |
| 2006/0206724 | A1* | 9/2006 | Schaufele ............... | G06F 21/32 726/16 |
| 2017/0011406 | A1* | 1/2017 | Tunnell ................ | G06Q 20/308 |
| 2018/0129795 | A1* | 5/2018 | Katz-Oz ................ | H04L 63/10 |

(Continued)

FOREIGN PATENT DOCUMENTS

WO WO-2017198014 A1 * 11/2017 ............ G06F 21/32

OTHER PUBLICATIONS

Yadav et al., Practical Approach towards Integrating Face Perception and Voice Representation, 2024, IEEE, 2024 International Conference on Communication, Computer Sciences and Engineering (IC3SE), 92-98 (Year: 2024).*

*Primary Examiner* — Catherine Thiaw
*Assistant Examiner* — Nega Woldemariam
(74) *Attorney, Agent, or Firm* — Jason A. Smith; Shumaker, Loop & Kendrick, LLP

(57) ABSTRACT

The present disclosure provides a multimodal artificial intelligence (AI) system comprising a physical AI interface with multimodal sensing capabilities, a configurable AI memory management system, a hierarchical compliance and policy enforcement engine, a compliance-driven data access control system based on identity and role classification, and a multimodal biometrics fusion system for incremental identity verification. The physical AI interface includes a sensor suite, an embedded compute module, and edge connectivity. The memory management system utilizes a tiered architecture with an embedding and indexing engine. The compliance engine incorporates layered architecture and policy-aware question generation. The data access control system employs role-based mapping and adaptive retrieval. The biometrics fusion system features simultaneous voice-face capture and incremental confidence building within natural conversation flow.

21 Claims, 7 Drawing Sheets

(56) References Cited

U.S. PATENT DOCUMENTS

| | | | | |
|---|---|---|---|---|
| 2018/0191695 | A1* | 7/2018 | Lindemann | H04L 63/0853 |
| 2019/0089701 | A1* | 3/2019 | Mercury | G06Q 10/105 |
| 2019/0236416 | A1* | 8/2019 | Wang | G06F 18/251 |
| 2019/0272361 | A1* | 9/2019 | Kursun | H04L 67/535 |
| 2019/0371099 | A1* | 12/2019 | Chen | G07C 9/00563 |
| 2020/0110864 | A1 | 4/2020 | Casado et al. | |
| 2022/0147602 | A1* | 5/2022 | Streit | G06F 18/253 |
| 2022/0342967 | A1* | 10/2022 | Battle | H04L 63/107 |
| 2023/0091318 | A1* | 3/2023 | Lindemann | H04L 63/0861 726/4 |
| 2024/0070251 | A1* | 2/2024 | Maizels | G06F 21/32 |
| 2024/0347065 | A1* | 10/2024 | Selvakumarasingam | G10L 17/18 |

* cited by examiner

MULTIMODAL AI AGENT WITH DYNAMIC PERSONA ADAPTATION AND COMPLIANCE ENFORCEMENT

FIELD OF INVENTION

The present disclosure relates to artificial intelligence systems, and more particularly to an interactive, voice- and vision-enabled AI interface with configurable memory management, hierarchical compliance enforcement, role-based data access, recruitment functionalities, and incremental biometric verification.

BACKGROUND

Artificial intelligence (AI) systems face significant technical challenges in providing seamless, context-aware interactions while maintaining compliance across diverse domains and use cases. Current AI implementations often struggle to integrate multiple input modalities, manage complex memory structures, and enforce hierarchical compliance rules in real-time. This limits their ability to deliver natural and effective user experiences, particularly in highly regulated industries.

Existing solutions typically rely on static configurations, predefined rule sets, and siloed data storage. While these approaches can address basic interaction needs, they fall short when handling dynamic contexts or complex compliance requirements. Many systems use separate modules for speech recognition, visual processing, and text analysis, leading to disjointed user experiences and increased latency. Additionally, current memory management techniques often fail to efficiently balance relevance and computational costs when retrieving historical data during ongoing conversations.

These limitations result in several technical problems. First, the lack of seamless multimodal integration hampers the system's ability to accurately interpret user intent and context. Second, inefficient memory management leads to either excessive computational overhead or loss of relevant historical context. Third, static compliance enforcement mechanisms having traditional authentication systems struggle to adapt to nuanced regulatory landscapes, potentially leading to data breach and compromised data privacy. Addressing these technical challenges is crucial for developing more advanced, adaptable, and compliant AI systems capable of natural and effective interactions across various applications.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a multimodal artificial intelligence (AI) system may be provided. The system may include a configurable AI memory management module utilizing a tiered memory architecture to store and retrieve information. The system may include a hierarchical compliance and policy enforcement module applying multi-layered compliance checks. The system may include a compliance-driven data access control module regulating access to stored information based on user identity and role classification. The system may include a voice-first AI recruitment and workforce management module facilitating recruitment processes. The system may include a multimodal biometrics fusion module for identity verification. The system may include a physical AI interface incorporating sensors and processing capabilities for multimodal interaction with users.

The configurable AI memory management module may include a short-term memory store maintaining context for recent conversation turns. The module may include a mid-term memory store preserving recurring topics or sessions. The module may include a long-term memory store archiving historical data accessible via embeddings. The module may further include an embedding and indexing engine that converts conversation segments into vector embeddings and maintains a vector database for retrieval of semantically similar segments.

The hierarchical compliance and policy enforcement module may include a user-level rule interpreter. The module may include a corporate policy engine. The module may include a government/regulatory compliance module. The module may further include a policy-aware question generation module that generates and reformulates questions to adhere to compliance rules.

The voice-first AI recruitment and workforce management module may include a candidate screening module utilizing predefined question templates and job requirement repositories. The module may include a candidate scoring model that analyzes candidate answers for semantic alignment with job requirements. The candidate scoring model may incorporate a continuous learning mechanism that adjusts its parameters based on real hiring outcomes.

According to another aspect of the present disclosure, a method for managing interactions in a multimodal artificial intelligence (AI) system may be provided. The method may include receiving user input through a physical AI interface. The method may include verifying user identity using a multimodal biometrics fusion module. The method may include determining user role and associated access permissions. The method may include processing user queries using a voice-first AI recruitment and workforce management module. The method may include checking queries and potential responses against multiple layers of compliance rules. The method may include retrieving relevant historical data using a configurable AI memory management module with a tiered architecture. The method may include generating a compliant response filtered based on user authorization level.

The step of verifying user identity using the multimodal biometrics fusion module may include capturing voice and facial data simultaneously. The step may include computing an initial identity confidence score. The step may include incrementally updating the identity confidence score through natural conversation if the initial score is below a threshold. The multimodal biometrics fusion module may adaptively weight voice and facial data based on environmental conditions The step of determining user role and associated access permissions may include classifying the user into a specific role based on verified identity. The step may include associating the role with a compliance profile dictating accessible data categories from different memory stores. The compliance profile may dynamically adjust retrieval parameters based on the user's role and applicable compliance rules.

The step of processing user queries using the voice-first AI recruitment and workforce management module may include accessing job requirements and screening questions from a connected Human Resource Management System. The step may include generating relevant screening questions that pass through the hierarchical compliance and policy enforcement module. The step may include analyzing candidate responses using a candidate scoring model. The candidate scoring model may incorporate a continuous learning mechanism that adjusts its parameters based on real hiring outcomes According to yet another aspect of the present disclosure, a non-transitory computer-readable medium storing instructions may be provided. When executed by a processor, the instructions may cause the processor to perform operations for a multimodal artificial intelligence (AI) system. The operations may include managing memory using a tiered architecture. The operations may include enforcing hierarchical compliance and policies. The operations may include controlling data access based on user identity and role. The operations may include facilitating voice-first AI recruitment and workforce management. The operations may include performing multimodal biometrics fusion for identity verification. The operations may include enabling multimodal interaction through a physical AI interface.

The operation of managing memory using a tiered architecture may include storing recent conversation context in a short-term memory store. The operation may include preserving recurring topics in a mid-term memory store. The operation may include archiving historical data in a long-term memory store accessible via embeddings. The operations may further include converting conversation segments into vector embeddings and maintaining a vector database for retrieval of semantically similar segments.

The operation of enforcing hierarchical compliance and policies may include applying user-level rules. The operation may include enforcing corporate policies. The operation may include ensuring adherence to government regulations. The operations may further include generating and reformulating questions to adhere to compliance rules.

The operation of facilitating voice-first AI recruitment and workforce management may include utilizing predefined question templates and job requirement repositories for candidate screening. The operation may include analyzing candidate answers for semantic alignment with job requirements using a candidate scoring model that incorporates continuous learning based on real hiring outcomes.

The foregoing general description of the illustrative embodiments and the following detailed description thereof are merely exemplary aspects of the teachings of this disclosure and are not restrictive.

BRIEF DESCRIPTION OF FIGURES

The accompanying drawings, which are incorporated in and constitute a part of this specification, illustrate embodiments of the disclosure and, together with the description, serve to explain the principles of the disclosure.

DETAILED DESCRIPTION

Figure 1:
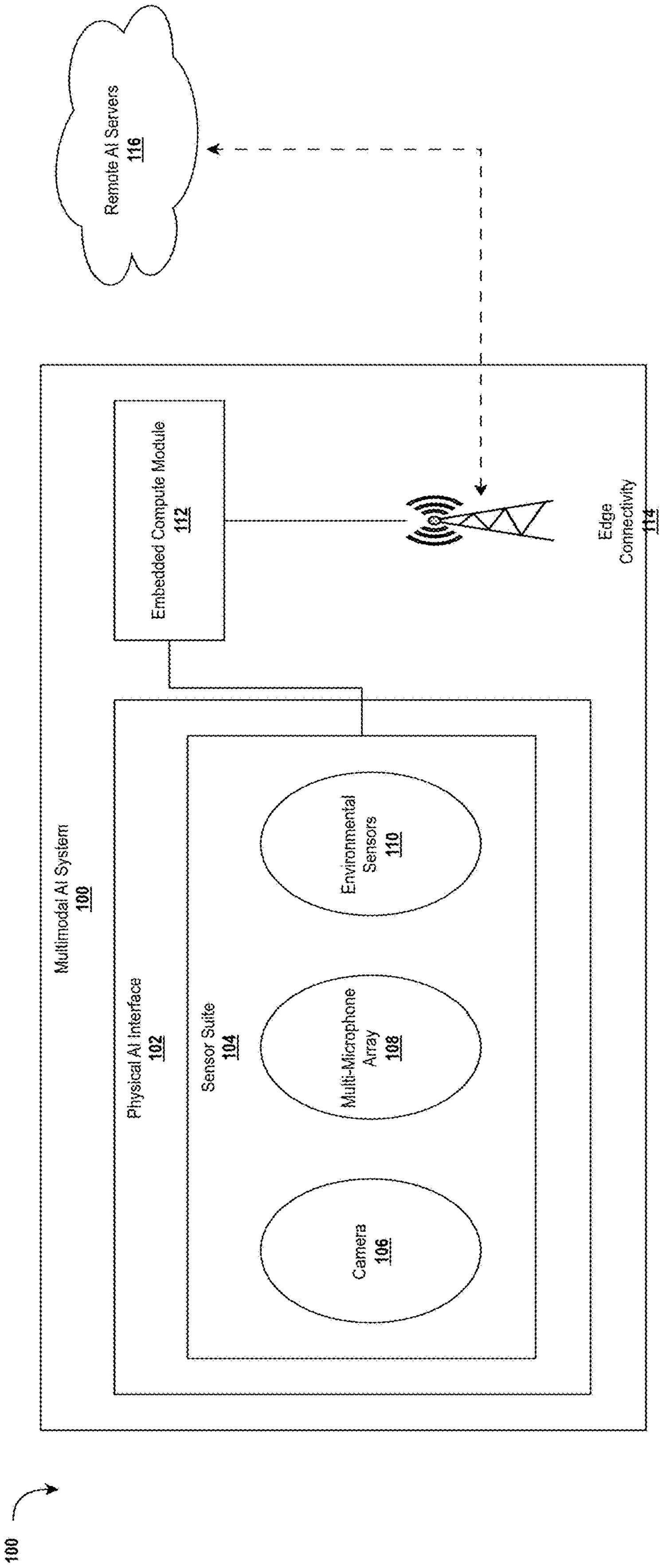
FIG. 1 illustrates a system diagram of a multimodal AI system, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a multimodal artificial intelligence (AI) system that integrates hierarchical compliance enforcement, adaptive memory management, and role-based data access control. This system may be embodied in various forms, including as an interactive physical interface or a software-based solution.

In some cases, the system incorporates a configurable AI memory management module that utilizes a tiered architecture to efficiently store and retrieve information. This module may balance relevance and computational cost when accessing stored data, ensuring optimal performance and resource utilization.

The system may also include a hierarchical compliance and policy enforcement module. This module may apply multi-layered compliance checks, incorporating user-level rules, corporate policies, and government regulations. In some cases, the module may dynamically adjust its behavior based on the user's role and environmental context.

A compliance-driven data access control module may be integrated into the system. This module may regulate access to stored information based on user identity and role classification, ensuring that sensitive data is only accessible to authorized individuals.

The system may incorporate a voice-first AI recruitment and workforce management module. This module may facilitate various aspects of the recruitment process, including candidate screening, interview scheduling, and applicant evaluation.

In some cases, the system may utilize a multimodal biometrics fusion module for identity verification. This module may combine voice and facial recognition technologies to incrementally build confidence in user identity through natural interaction.

The system may be implemented as a physical AI interface, sometimes referred to as a "Maayu Doll." This interface may incorporate various sensors and processing capabilities to enable multimodal interaction with users.

By integrating these modules, the system may provide a comprehensive solution for AI-driven interactions that prioritize compliance, data security, and user experience across various domains and use cases.

The system architecture of the present disclosure may comprise several interconnected modules and engines that work together to provide an integrated, intelligent, and compliant AI-driven interface. These modules may include a Configurable AI Memory Management Module, a Hierarchical Compliance and Policy Enforcement Module, a Compliance-Driven Data Access Control Module, a Voice-First AI Recruitment and Workforce Management Module, a Multimodal Biometrics Fusion Module, and a Physical AI Interface Module.

The Configurable AI Memory Management Module may be responsible for efficiently storing, retrieving, and managing conversation data across different time horizons. This module may utilize a tiered memory architecture to balance between immediate context retention and long-term knowledge preservation.

The Hierarchical Compliance and Policy Enforcement Module may ensure that all system interactions adhere to multiple layers of rules and regulations. This module may dynamically apply user-level, corporate, and governmental policies to maintain compliance throughout the system's operations.

Working in conjunction with the compliance module, the Compliance-Driven Data Access Control Module may regulate access to stored information based on user identity and role classification. This module may dynamically adjust the depth and breadth of accessible data to align with compliance requirements and user authorization levels.

The Voice-First AI Recruitment and Workforce Management Module may specialize in handling recruitment-related tasks. This module may leverage natural language processing and domain-specific knowledge to conduct interviews, screen candidates, and assist in various HR functions.

The Multimodal Biometrics Fusion Module may provide robust user identification and verification capabilities. By combining voice and facial recognition technologies, this module may offer seamless and continuous identity confirmation throughout user interactions.

The Physical AI Interface Module, which may be embodied as a "Maayu Doll," may serve as the tangible point of interaction for users. This module may integrate various sensors and input/output devices to facilitate natural, multimodal communication between users and the AI system.

These modules may interact in a coordinated manner to process user inputs, retrieve relevant information, ensure compliance, verify user identity, and generate appropriate responses. For example, when a user interacts with the Physical AI Interface, the Multimodal Biometrics Fusion Module may first verify the user's identity. The user's query may then be processed by the Voice-First AI Recruitment Module, which may consult the Configurable AI Memory Management Module for relevant historical data. Before generating a response, the system may check with the Hierarchical Compliance Module to ensure adherence to all applicable rules. Finally, the Compliance-Driven Data Access Control Module may filter the response based on the user's authorization level before it is delivered through the Physical AI Interface.

This modular architecture may allow for flexibility and scalability, enabling the system to be adapted for various use cases and industries while maintaining a consistent framework for intelligent, compliant, and user-friendly AI interactions.

The system may include a configurable AI memory management module that utilizes a tiered memory architecture. This architecture may comprise short-term, mid-term, and long-term memory stores, each serving distinct purposes in information retention and retrieval.

In some cases, the short-term memory store may maintain context for recent conversation turns directly relevant to a user's immediate query. The mid-term memory store may preserve recurring topics or sessions frequently accessed within a set time window. The long-term memory store may archive compressed or indexed historical data accessible via embeddings.

The configurable AI memory management module may incorporate an embedding and indexing engine. This engine may convert conversation segments into vector embeddings. In some cases, the embedding and indexing engine may maintain a vector database or index, allowing for fast retrieval of semantically similar segments from the mid-term and long-term memory stores.

A cost and relevance manager may be integrated into the configurable AI memory management module. This manager may balance retrieval cost and relevance when deciding which memory segments to fetch. In some cases, the cost and relevance manager may include a relevance scoring module that scores memory candidate segments against a user's current query. The manager may also incorporate a cost function evaluator that estimates computational or financial costs associated with retrieving additional historical segments.

The configurable AI memory management module may implement an adaptive memory retention policy. This policy may automatically downsample or archive infrequently accessed data. In some cases, the adaptive memory retention policy may include a usage analytics module that monitors retrieval frequency and user patterns to dynamically adjust how memory tiers are populated or pruned over time.

For example, when a user poses a query, the system may first check the short-term memory store for relevant information. If the required information is not found, the system may then search the mid-term and long-term memory stores using the embedding and indexing engine. The cost and relevance manager may determine how many and which segments to retrieve based on their relevance to the query and the associated retrieval costs.

In some cases, if a particular type of information is frequently accessed, the adaptive memory retention policy may adjust to keep this information in the mid-term memory store for quicker future retrieval. Conversely, rarely accessed data may be compressed or moved to the long-term memory store to optimize system resources.

The configurable AI memory management module may enable the system to efficiently handle large volumes of data while maintaining responsiveness and resource efficiency. By balancing relevance, cost, and adaptive retention, the module may provide optimal performance across various use cases and data loads.

The hierarchical compliance and policy enforcement module may be a key component of the system, ensuring that all interactions and operations adhere to multiple layers of rules and regulations. This module may incorporate several sub-components that work together to maintain compliance throughout the system's operations.

In some cases, the module may utilize a compliance layered architecture. This architecture may consist of multiple levels of compliance checks, each addressing different aspects of regulatory requirements. For example, the architecture may include a user-level rule interpreter, a corporate policy engine, and a government/regulatory compliance module. The user-level rule interpreter may process immediate user instructions against basic filters, such as profanity checks or disallowed queries. The corporate policy engine may integrate a corporate policies rulebase, which may be accessible through a knowledge graph or rules engine. The government/regulatory compliance module may apply jurisdiction-specific regulations, using predefined legal frameworks stored in a compliance database.

The module may also include a policy-aware question generation module. This sub-component may integrate with a language model configured to create questions on demand. Before finalizing a generated question, the system may check it against the hierarchical compliance rules. If a question violates any restriction, the policy-aware question generation module may automatically rephrase or replace the question until it meets all compliance criteria. This process may ensure that any proactive inquiry the AI makes adheres to the layered compliance standards. For example, in a recruitment scenario, if the system generates a question about a candidate's age, which may violate non-discrimination policies, the module may reformulate the question to focus on relevant work experience instead.

A policy decision and override unit may be another crucial component of the hierarchical compliance and policy enforcement module. This unit may include a semantic parser that converts user requests into structured semantic representations. A policy checker within the unit may evaluate these representations against layered rule sets. If a request violates rules, the system may either deny it or reformulate the query into a compliant version before passing it to the AI assistant. For instance, if a user asks for information that violates data privacy regulations, the policy decision and override unit may modify the query to provide only permissible, anonymized data.

In some cases, the module may incorporate a compliance audit and logging system. This system may include a logging database that stores each decision, the rules triggered, and the final action taken. An audit interface may be provided, allowing compliance officers or administrators to review historical compliance decisions. This feature may be particularly useful for demonstrating regulatory compliance or identifying patterns in policy violations that may require additional training or system adjustments.

The hierarchical compliance and policy enforcement module may work in conjunction with other system components to ensure comprehensive compliance. For example, it may interact with the configurable AI memory management module to ensure that data retrieval adheres to compliance rules. It may also collaborate with the compliance-driven data access control module to regulate access to stored information based on user identity and role classification.

By integrating these various sub-components, the hierarchical compliance and policy enforcement module may provide a robust framework for maintaining compliance across different levels of regulatory requirements. This approach may allow the system to adapt to various industries and use cases while consistently enforcing relevant policies and regulations.

The compliance-driven data access control module may regulate access to stored information based on user identity and role classification. This module may work in conjunction with the hierarchical compliance and policy enforcement module to ensure that users can only access data appropriate to their role and authorization level.

In some cases, the module may incorporate a role-based compliance mapping feature. This feature may classify users into specific roles (e.g., candidate, recruiter, hiring manager) once their identity is confirmed. Each role may be associated with a compliance profile that dictates what categories of data can be retrieved from the various memory stores.

The module may include a hierarchical compliance engine that integrates user role, corporate policies, and government regulations to determine the permissible data retrieval depth. This engine may dynamically adjust retrieval parameters based on the user's role and the applicable compliance rules. For example, a hiring manager with a high-trust rating may be allowed access to long-term memory data, while a candidate may be restricted to short-term memory and anonymized data only.

An adaptive memory retrieval feature may be implemented within the module. Based on the compliance results, this feature may selectively pull data from various memory stores. In some cases, high-trust roles with strong compliance clearance may access historical data, while lower-trust roles may be limited to short-term memory only.

For instance, when a verified hiring manager queries the system about a candidate's prior experience, the compliance-driven data access control module may determine that the hiring manager's role allows access to long-term memory. The module may then fetch the appropriate archival data. However, if the same query were made by a candidate or a guest user, the system may refuse access or provide only summary-level data to maintain compliance with data privacy regulations.

In some cases, the module may dynamically adjust access levels based on the context of the interaction. For example, during an initial screening interview, a recruiter may have limited access to candidate data. As the recruitment process progresses, the recruiter's access level may be incrementally increased, allowing for more detailed candidate information retrieval.

The compliance-driven data access control module may also implement logging and auditing functionalities. These features may record all data access requests and their outcomes, providing a traceable history of system interactions for compliance verification and potential audits.

By implementing role-based compliance mapping, hierarchical compliance checks, and adaptive memory retrieval, the compliance-driven data access control module may ensure that data access is tailored to each user's role and authorization level. This approach may help maintain data privacy and regulatory compliance while providing users with the information necessary for their specific tasks within the system.

The voice-first AI recruitment and workforce management module may incorporate several components designed to streamline and enhance the recruitment process. This module may leverage natural language processing and domain-specific knowledge to conduct interviews, screen candidates, and assist in various HR functions.

The multimodal AI system, embodied as the "Maayu Doll", may function as a standalone job search assistant, eliminating the need for users to have access to a computer, internet, or phone. This functionality may be implemented through the integration of several modules and engines within the system.

The physical AI interface module of the Maayu Doll may incorporate a voice recognition system and a speaker for audio output, allowing users to interact with the system through natural language conversations. The voice-first AI recruitment and workforce management module may process user queries related to job searches, leveraging its natural language processing capabilities to understand user intent and requirements.

In some cases, the configurable AI memory management module may store and retrieve relevant job listings, company information, and industry trends. This module may utilize its tiered memory architecture to efficiently manage and update job-related data, ensuring that users have access to the most current information.

The hierarchical compliance and policy enforcement module may ensure that all job search interactions adhere to relevant employment laws and regulations, such as equal opportunity guidelines and data protection requirements.

For example, a user might approach the Maayu Doll and say, "I'm looking for entry-level software engineering positions in the local area." The system may then process this request through its various modules:

The voice recognition system in the physical AI interface module may convert the speech to text.

The voice-first AI recruitment module may interpret the user's intent and extract key information (job type, experience level, location).

The configurable AI memory management module may retrieve relevant job listings from its stored data.

The hierarchical compliance module may ensure that the search and results comply with all applicable regulations.

The system may then verbally communicate the job opportunities to the user through its speaker, saying something like, "I've found three entry-level software engineering positions within a 20-mile radius. Would you like me to describe them to you?"

The user may continue the interaction, asking for more details about specific positions, requesting advice on resume preparation, or inquiring about interview tips. The Maayu Doll may provide this information verbally, drawing from its various knowledge bases and adapting its responses based on the user's needs and preferences.

This functionality may allow users without access to traditional job search tools to still engage in a comprehensive job search process, receiving up-to-date information, personalized recommendations, and compliance-aware guidance through a conversational interface.

The multimodal AI system may incorporate advanced security features to protect sensitive data and ensure seamless integration with enterprise systems. In some cases, the system may implement encrypted data fragmentation via decentralized cloud storage to simultaneously protect candidate profiles and biometric data while building a scalable data management system. This approach may make it possible to easily integrate Maayu candidate data into enterprise customers'Applicant Tracking Systems (ATS) and other HR/recruiting systems.

The decentralized cloud infrastructure may enhance security, especially given the additional risks posed by keeping a physical machine in various locations. In some cases, no data may be stored on local hardware, and a remote 'kill' switch may be implemented to wipe the machine or disable it if necessary. This feature may provide an additional layer of security in case of physical theft or unauthorized access attempts.

The multimodal biometrics fusion module may be enhanced with additional biometric verification methods. In some cases, the system may implement equipment that can perform iris scans, leveraging deep learning models, specifically Convolutional Neural Networks (CNNs), in combination with voice authentication. This multi-factor biometric authentication may significantly increase the accuracy and security of user identification.

The physical AI interface, which may be embodied as a "Maayu Doll," may incorporate specialized hardware to support these advanced biometric features. For example, an iris recognition infrared camera may be integrated into the device to capture high-quality iris scans. This hardware addition may work in conjunction with the existing voice recognition capabilities to provide a robust, multi-modal biometric verification system.

The Biometric Anomaly Detection Algorithm within the multimodal biometrics fusion module may be expanded to incorporate data from iris scans. This algorithm may now analyze patterns across voice, facial, and iris data to detect potential identity fraud attempts. For instance, if the algorithm detects a mismatch between the iris scan and the voice pattern of a user claiming to be a returning candidate, it may flag this as a high-priority security concern The encrypted data fragmentation system may work in tandem with the configurable AI memory management module to ensure that sensitive data is securely stored and efficiently retrieved. For example, when a candidate's profile is created or updated, the system may encrypt the data and distribute fragments across the decentralized cloud storage. When an authorized user, such as a recruiter, needs to access this information, the system may reassemble and decrypt the data fragments in real-time, providing seamless access while maintaining high security standards.

The compliance-driven data access control module may be adapted to work with the decentralized storage system, ensuring that access to fragmented data complies with relevant regulations and company policies. For instance, when an enterprise customer's ATS requests candidate data, the module may verify the request's compliance, retrieve and reassemble only the authorized data fragments, and securely transmit the information to the ATS.

These enhancements may significantly improve the system's security, scalability, and integration capabilities, making it a more robust and versatile solution for AI-driven recruitment and workforce management.

In some cases, the module may include a specialized recruitment persona configuration. This persona may be designed to screen candidates, schedule interviews, and score applicants. The recruitment persona may utilize predefined question templates and job requirement repositories to conduct initial candidate screenings. In some cases, the persona may integrate with scheduling and calendar systems to efficiently manage interview appointments and reminders.

The module may incorporate a compliance and data integration layer. This layer may ensure that every user query or system-generated question is validated by the hierarchical compliance engine, maintaining adherence to relevant regulations and corporate policies throughout the recruitment process. In some cases, the module may include an HR data sync component that establishes a real-time connection to corporate Human Resource Management Systems (HRMS) or Applicant Tracking Systems (ATS) to fetch and update candidate information.

The configurable AI memory management module may incorporate several machine learning algorithms to optimize its performance and adapt to changing usage patterns.

In some cases, a Memory Relevance Prediction Algorithm may be implemented to predict which memory segments are most likely to be relevant for future queries. This algorithm may utilize techniques such as recurrent neural networks (RNNs) or long short-term memory (LSTM) networks to analyze patterns in user queries and system responses over time. The algorithm may be trained on historical interaction data, learning to associate certain types of queries with specific memory segments. For example, if a user frequently asks about a particular job role, the algorithm may learn to prioritize memory segments related to that role's requirements and responsibilities.

The Memory Relevance Prediction Algorithm may output a relevance score for each memory segment given a new query. For instance, if a user asks about software engineering positions, the algorithm might assign high relevance scores to memory segments containing information about programming languages, software development methodologies, and previous interactions with software engineering candidates. The algorithm may improve over time by continuously updating its weights based on the actual relevance of retrieved memory segments to user queries, as determined by user feedback or subsequent interactions.

An Adaptive Memory Retention Policy Algorithm may also be implemented within the configurable AI memory management module. This algorithm may employ reinforcement learning techniques, such as Q-learning or policy gradient methods, to optimize the retention and archival of memory segments across different tiers. The algorithm may be trained on a reward function that balances factors such as retrieval speed, storage costs, and information relevance.

The Adaptive Memory Retention Policy Algorithm may output decisions on whether to retain, archive, or discard specific memory segments. For example, if a particular piece of information about a company policy is frequently accessed during recruitment processes, the algorithm may decide to keep this information in the mid-term memory store for quicker retrieval. Conversely, if candidate data from several years ago is rarely accessed, the algorithm may choose to compress this data and move it to long-term storage. The algorithm may improve its performance by tracking the outcomes of its decisions and adjusting its policy to maximize the defined reward function over time.

In some cases, a Memory Embedding Optimization Algorithm may be implemented to enhance the efficiency and effectiveness of the embedding and indexing engine. This algorithm may utilize unsupervised learning techniques such as autoencoders or contrastive learning to generate more meaningful and compact vector representations of memory segments. The algorithm may be trained on a large corpus of conversation data, learning to capture semantic similarities and contextual relationships between different pieces of information.

The Memory Embedding Optimization Algorithm may output optimized vector embeddings for new memory segments. For instance, given a new conversation about a candidate's experience with agile development methodologies, the algorithm might generate an embedding that places this information close to other memory segments related to software development practices and team collaboration in the vector space. This algorithm may improve over time by fine-tuning its embeddings based on retrieval performance and user feedback, gradually learning to generate more discriminative and contextually relevant embeddings.

The hierarchical compliance and policy enforcement module may incorporate machine learning algorithms to enhance its ability to interpret and apply complex compliance rules across various contexts.

In some cases, a Compliance Rule Interpretation Algorithm may be implemented to automatically parse and interpret new compliance rules or policy updates. This algorithm may utilize natural language processing (NLP) techniques such as named entity recognition (NER) and semantic parsing to extract key elements and relationships from policy documents. The algorithm may be trained on a large corpus of annotated compliance documents, learning to identify relevant entities, actions, and conditions specified in the rules.

The Compliance Rule Interpretation Algorithm may output structured representations of compliance rules that can be easily integrated into the system's decision-making processes. For example, given a new policy document about data privacy regulations, the algorithm might extract and structure rules about what types of personal information can be collected, how long it can be retained, and under what circumstances it can be shared. The algorithm may improve over time through active learning techniques, where human experts review and correct its interpretations, allowing it to refine its understanding of complex legal and policy language A Dynamic Compliance Checking Algorithm may also be implemented within the hierarchical compliance and policy enforcement module. This algorithm may employ ensemble learning techniques, combining multiple classifiers such as decision trees, random forests, and support vector machines to evaluate the compliance of system actions and user requests against the multi-layered rule set. The algorithm may be trained on historical compliance decisions, learning to identify patterns and relationships between different compliance factors.

The Dynamic Compliance Checking Algorithm may output compliance scores or binary decisions for proposed actions or responses. For instance, if a recruiter requests access to a candidate's full employment history, the algorithm might evaluate this request against various compliance layers, considering factors such as the recruiter's role, the candidate's consent status, and relevant data protection regulations. Based on this evaluation, the algorithm may output a decision to grant full access, provide partial access, or deny the request entirely. The algorithm may improve its accuracy over time through online learning techniques, updating its models based on feedback from compliance officers and the outcomes of compliance audits.

In some cases, a Compliance-Aware Question Generation Algorithm may be implemented to assist the policy-aware question generation module. This algorithm may utilize sequence-to-sequence learning techniques, such as transformer models or generative adversarial networks (GANs), to generate or reformulate questions that adhere to compliance rules. The algorithm may be trained on pairs of non-compliant and compliant questions, learning to transform potentially problematic queries into acceptable alternatives.

The Compliance-Aware Question Generation Algorithm may output compliant versions of input questions or generate new compliant questions based on given topics. For example, if an initial question about a candidate's family status is flagged as potentially discriminatory, the algorithm might reformulate it to focus on the candidate's ability to meet job requirements, such as travel or flexible working hours. The algorithm may improve its performance through reinforcement learning, receiving rewards for generating questions that pass compliance checks and are effective in eliciting relevant information from candidates.

The compliance-driven data access control module may leverage machine learning algorithms to enhance its ability to manage and adapt access permissions based on user roles, compliance requirements, and contextual factors.

In some cases, a Dynamic Role Classification Algorithm may be implemented to automatically classify users into specific roles based on their interactions with the system and verified identity information. This algorithm may utilize supervised learning techniques such as support vector machines (SVMs) or gradient boosting classifiers to learn the mapping between user characteristics and appropriate role classifications. The algorithm may be trained on historical user data, including interaction patterns, access requests, and manually assigned roles.

The Dynamic Role Classification Algorithm may output role predictions for users, along with confidence scores. For example, given a new user's interaction history and verified credentials, the algorithm might classify them as a "senior recruiter" with a high confidence score, or as a "hiring manager" with a lower confidence score if their behavior patterns are less clear-cut. The algorithm may improve over time through incremental learning, updating its models as it observes more user interactions and receives feedback on its classifications from system administrators.

An Adaptive Access Permission Algorithm may also be implemented within the compliance-driven data access control module. This algorithm may employ reinforcement learning techniques, such as multi-armed bandits or contextual bandits, to dynamically adjust access permissions based on user roles, compliance rules, and contextual factors. The algorithm may be trained on a reward function that balances factors such as data security, user productivity, and compliance adherence.

The Adaptive Access Permission Algorithm may output decisions on whether to grant, deny, or modify access to specific data categories or system functions for a given user in a particular context. For instance, if a recruiter frequently requires access to certain types of candidate data to perform their job effectively, the algorithm might gradually expand their default access permissions for those data categories. Conversely, if a user rarely accesses certain sensitive information, the algorithm may restrict access to those data types to reduce potential security risks. The algorithm may improve its performance by tracking the outcomes of its decisions, such as successful task completions or compliance violations, and adjusting its policy to maximize the defined reward function over time.

In some cases, a Contextual Compliance Profile Generator may be implemented to create and update dynamic compliance profiles for different user roles. This algorithm may utilize unsupervised learning techniques such as clustering algorithms (e.g., k-means or hierarchical clustering) or dimensionality reduction methods (e.g., t-SNE or UMAP) to identify patterns in user behavior and compliance requirements across different contexts. The algorithm may be trained on large datasets of user interactions, access patterns, and compliance rules.

The Contextual Compliance Profile Generator may output adaptive compliance profiles that specify allowed data access and actions for different user roles across various contexts. For example, the algorithm might generate a profile for a "recruiter" role that allows access to candidate personal information during active recruitment processes but restricts access once a position is filled. These profiles may dynamically adjust based on factors such as the stage of the recruitment process, the sensitivity of the information, or changes in regulatory requirements. The algorithm may improve its profiling accuracy through continuous learning, refining its understanding of role-based compliance needs as it observes more interactions and receives feedback from compliance audits.

The voice-first AI recruitment and workforce management module may incorporate several machine learning algorithms to enhance its ability to conduct effective interviews, evaluate candidates, and adapt to changing recruitment needs.

In some cases, an Adaptive Interview Question Sequencing Algorithm may be implemented to dynamically select and order interview questions based on the candidate's responses and the specific job requirements. This algorithm may utilize reinforcement learning techniques, such as Q-learning or policy gradient methods, to learn optimal question sequences that maximize information gain and candidate evaluation accuracy. The algorithm may be trained on historical interview data, including question sequences, candidate responses, and hiring outcomes.

The Adaptive Interview Question Sequencing Algorithm may output a sequence of questions tailored to each candidate and job role. For example, if a candidate demonstrates strong technical skills but lacks clarity on their teamwork experience, the algorithm might prioritize follow-up questions about collaboration and project management. The algorithm may improve over time by analyzing the effectiveness of its question sequences in predicting candidate success and adjusting its policy to optimize for better hiring outcomes.

A Semantic Response Analysis Algorithm may also be implemented within the voice-first AI recruitment module. This algorithm may employ natural language processing (NLP) techniques, such as transformer models or recurrent neural networks (RNNs), to analyze the semantic content and relevance of candidate responses. The algorithm may be trained on a large corpus of annotated interview responses, learning to identify key indicators of candidate suitability for specific roles.

The Semantic Response Analysis Algorithm may output relevance scores and semantic similarity metrics for candidate responses in relation to job requirements. For instance, given a candidate's answer about their experience with agile development methodologies, the algorithm might generate high relevance scores for software engineering positions that emphasize agile practices. The algorithm may improve its analysis capabilities through transfer learning and fine-tuning on domain-specific datasets, allowing it to better understand industry-specific terminology and concepts.

In some cases, a Candidate Scoring Model Evolution Algorithm may be implemented to continuously refine the candidate scoring model based on hiring outcomes and job performance data. This algorithm may utilize ensemble learning techniques, combining multiple models such as random forests, gradient boosting machines, and neural networks to generate comprehensive candidate evaluations. The algorithm may be trained initially on historical hiring data and then continuously updated with new outcome data.

The Candidate Scoring Model Evolution Algorithm may output refined scoring models that more accurately predict candidate success in specific roles. For example, if the algorithm observes that candidates with a particular combination of skills and experiences tend to perform well in certain positions, it may adjust the scoring weights to prioritize these factors in future evaluations. The algorithm may improve its predictive accuracy through online learning techniques, incrementally updating its models as new hiring and performance data become available.

The multimodal biometrics fusion module may leverage machine learning algorithms to enhance its ability to verify user identities across different modalities and adapt to varying environmental conditions.

In some cases, an Adaptive Biometric Weighting Algorithm may be implemented to dynamically adjust the importance of different biometric inputs based on environmental factors and signal quality. This algorithm may employ multi-task learning techniques, simultaneously optimizing for accuracy across different modalities while adapting to changing conditions. The algorithm may be trained on diverse datasets that include biometric data collected under various environmental conditions.

The Adaptive Biometric Weighting Algorithm may output optimized weights for combining voice, facial, and potentially other biometric data in real-time. For example, in a noisy environment, the algorithm might assign a higher weight to facial recognition data while reducing the influence of potentially unreliable voice data. Conversely, in low-light conditions, it may prioritize voice recognition over facial data. The algorithm may improve its performance through online learning, continuously refining its weighting strategy based on successful identity verifications and user feedback.

A Continuous Identity Confidence Estimation Algorithm may also be implemented within the multimodal biometrics fusion module. This algorithm may utilize recurrent neural networks (RNNs) or long short-term memory (LSTM) networks to model the temporal aspects of user interactions and incrementally update identity confidence scores. The algorithm may be trained on sequences of biometric data collected during natural conversations, learning to identify patterns that indicate consistent or changing user identity over time.

The Continuous Identity Confidence Estimation Algorithm may output dynamically updated confidence scores for user identity throughout an interaction. For instance, as a user engages in conversation with the system, the algorithm might start with a moderate confidence score based on initial biometric data, then gradually increase or decrease this score as it processes more voice samples and facial expressions. The algorithm may improve its estimation accuracy through reinforcement learning techniques, receiving rewards for maintaining high confidence scores for genuine users while quickly detecting potential identity mismatches.

In some cases, a Biometric Anomaly Detection Algorithm may be implemented to identify unusual patterns or inconsistencies in biometric data that might indicate attempted identity fraud. This algorithm may employ unsupervised learning techniques such as autoencoders or one-class SVMs to learn the typical patterns of genuine user interactions across different modalities. The algorithm may be trained on large datasets of normal biometric data, learning to recognize the boundaries of typical behavior.

The Biometric Anomaly Detection Algorithm may output anomaly scores or alerts for unusual biometric patterns detected during user interactions. For example, if the algorithm detects a sudden change in speech patterns or facial expressions that deviate significantly from the user's established baseline, it might flag this as a potential security concern. The algorithm may improve its detection capabilities through active learning, where human experts review and validate its anomaly detections, allowing it to refine its understanding of what constitutes genuinely anomalous behavior versus natural variations in biometric data.

Machine learning components may play a crucial role in the voice-first AI recruitment and workforce management module. These components may include a candidate scoring model that analyzes candidate answers for semantic alignment with job requirements. The candidate scoring model may refine over time for better hiring outcomes. In some cases, the model may incorporate a continuous learning mechanism that adjusts its parameters based on real hiring outcomes, improving its accuracy and effectiveness over time.

For example, when a candidate interacts with the system, the recruitment persona may initiate a conversation by asking predefined screening questions relevant to the job opening. The compliance layer may ensure that these questions adhere to all applicable regulations and company policies. As the candidate responds, the candidate scoring model may analyze the answers in real-time, comparing them against the job requirements and generating a preliminary suitability score.

In some cases, the system may use this score to determine whether to proceed with scheduling an interview or to ask additional follow-up questions. The scheduling component may then interface with the company's calendar system to find suitable time slots for interviews with human recruiters or hiring managers.

Over time, as the system accumulates data on which candidates were ultimately hired and their subsequent job performance, the candidate scoring model may adjust its parameters. For instance, if candidates who used certain keywords or demonstrated specific skills during the initial screening tend to be more successful in the role, the model may assign higher weights to these factors in future screenings.

The voice-first AI recruitment and workforce management module may provide a comprehensive solution for automating and optimizing various aspects of the recruitment process, from initial candidate screening to interview scheduling and applicant evaluation. By leveraging advanced natural language processing, machine learning, and integration with existing HR systems, this module may significantly enhance the efficiency and effectiveness of recruitment efforts.

The multimodal biometrics fusion module may incorporate a voice-face embedding fusion engine that combines voice and facial data for user identification. This engine may adaptively weight each modality based on environmental conditions. For example, in a noisy environment, the system may place greater emphasis on facial recognition, while in low-light conditions, voice recognition may be given more weight.

The module may utilize an incremental confidence building mechanism that gathers additional voice or visual samples within a natural conversation flow. This approach may allow the system to verify user identity without overt identity checks, enhancing the user experience.

In some cases, the voice-face embedding fusion engine may capture voice and facial data simultaneously during user interactions. The engine may then compute initial identity confidence from the first samples. If the confidence score is below a certain threshold, the system may continue the conversation to collect additional samples, updating a rolling identity confidence score as more data is gathered.

The incremental confidence building mechanism may be designed to engage the user in a natural, domain-relevant conversation. For instance, if the system is operating in a recruitment context, it may initiate casual introductory chatter about the job market. This approach may allow the system to capture additional voice samples and facial angles without explicitly mentioning verification attempts or additional biometric gathering.

The module may also incorporate a non-intrusive prompting feature. This feature may be designed to elicit additional user responses naturally if the identity confidence score remains below the required threshold. For example, instead of asking the user to repeat their name, the system may say, "That's interesting, could you tell me more about your experience in customer service?" This approach may allow the system to gather more biometric data while maintaining a seamless user experience.

In some cases, the multimodal biometrics fusion module may use a confidence-based interaction algorithm. This algorithm may select follow-up questions from a predefined set of natural, contextually relevant prompts if the identity confidence score is below the threshold. Once the score surpasses the threshold, the system may proceed to normal tasks without the user suspecting a verification issue.

For example, a user may approach the system, which captures an initial voice sample amidst ambient noise and a facial image in dim lighting. The fusion algorithm may compute a low confidence score due to poor facial clarity. The system may then respond naturally: "Thanks for stopping by. Could you tell me a bit about your background in retail?" As the user responds, better lighting angles may be captured, and voice patterns may be further analyzed, improving the confidence score. After one or two more conversational turns, the identity confidence may cross the required threshold, allowing the system to seamlessly transition to providing personalized assistance.

This approach to multimodal biometrics fusion may offer a more user-friendly and robust solution compared to static verification attempts or single-modality approaches. By incrementally improving identity confidence through natural conversation, the system may provide a seamless and secure user experience across various environmental conditions and use cases.

The physical AI interface, which may be embodied as a "Maayu Doll," may incorporate various components to enable natural, multimodal interaction with users. In some cases, the interface may include a sensor suite comprising a multi-microphone array, a camera module, and environmental sensors. This sensor suite may allow the system to capture audio, visual, and contextual information from its surroundings.

An embedded compute module may be integrated into the physical AI interface. This module may be capable of running local speech-to-text (STT), text-to-speech (TTS), and minimal computer vision (CV) tasks. In some cases, the embedded compute module may be an ARM-based or x86 single-board computer, providing sufficient processing power for these local operations.

The physical AI interface may incorporate an audio processing pipeline to enhance voice interactions. In some cases, this pipeline may include a beamforming digital signal processing (DSP) module. The beamforming DSP module may process raw microphone input to enhance the primary speaker's voice and suppress background noise. This feature may be particularly useful in noisy environments, allowing the system to maintain clear communication with users.

An on-device compliance cache may be implemented within the physical AI interface. This cache may store minimal compliance rules to immediately block obviously disallowed queries before streaming to the cloud for further processing. In some cases, the on-device compliance cache may serve as a first line of defense against potential policy violations, enhancing the system's overall compliance enforcement capabilities.

The physical AI interface may interact with users through various modalities. For example, when a user approaches the interface, the multi-microphone array may capture the user's voice, while the camera module simultaneously records visual information. The beamforming DSP module may then process the audio input to isolate the user's voice from any background noise.

As the user speaks, the embedded compute module may perform local STT processing to convert the speech into text. Before sending this text to the cloud for further analysis, the on-device compliance cache may quickly check for any overtly disallowed content. If no violations are detected, the query may be sent to the cloud for more advanced processing.

In some cases, the physical AI interface may respond to the user using its TTS capabilities, converting the system's response into spoken language. The camera module may also be used to capture visual cues from the user, potentially aiding in tasks such as identity verification or emotion recognition.

The environmental sensors integrated into the physical AI interface may provide additional context for user interactions. For instance, these sensors may detect ambient noise levels or lighting conditions, allowing the system to adjust its audio processing or visual analysis algorithms accordingly.

By combining these various components, the physical AI interface may provide a robust and responsive platform for user interactions, balancing local processing capabilities with cloud-based resources while maintaining a baseline level of compliance enforcement.

The system may integrate multiple modules to provide a comprehensive, intelligent, and compliant AI-driven interface. These modules may work in concert to process user inputs, retrieve relevant information, ensure compliance, verify user identity, and generate appropriate responses.

In some cases, when a user interacts with the physical AI interface, the multimodal biometrics fusion module may first verify the user's identity. This module may capture voice and facial data simultaneously, adaptively weighting each modality based on environmental conditions. For example, in a noisy environment, the system may place greater emphasis on facial recognition, while in low-light conditions, voice recognition may be given more weight.

Once the user's identity is verified, the compliance-driven data access control module may determine the user's role and associated access permissions. This module may regulate access to stored information based on the user's role classification, ensuring that sensitive data is only accessible to authorized individuals.

The user's query may then be processed by the voice-first AI recruitment and workforce management module, if the system is being used in a recruitment context. This module may leverage natural language processing and domain-specific knowledge to understand and respond to recruitment-related queries.

Before generating a response, the hierarchical compliance and policy enforcement module may check the query and potential response against multiple layers of rules and regulations. This module may apply user-level, corporate, and governmental policies to maintain compliance throughout the system's operations.

The configurable AI memory management module may be consulted to retrieve relevant historical data. This module may utilize its tiered memory architecture to efficiently store and retrieve information, balancing relevance and computational cost when accessing stored data.

After ensuring compliance and retrieving relevant information, the system may generate a response. The compliance-driven data access control module may then filter the response based on the user's authorization level before it is delivered through the physical AI interface.

In some cases, the system may operate across various scenarios. For example, in a recruitment scenario, a candidate may approach the system for an initial screening interview. The multimodal biometrics fusion module may verify the candidate's identity through natural conversation, gathering additional voice and facial data as needed. The compliance-driven data access control module may then set appropriate data access permissions for a candidate role.

The voice-first AI recruitment module may conduct the interview, asking pre-approved questions and analyzing the candidate's responses. The hierarchical compliance module may ensure all questions and analyses adhere to relevant employment laws and company policies. The configurable AI memory management module may store the interview data for future reference, potentially in its mid-term memory store for easy access during the ongoing recruitment process.

In another scenario, a hiring manager may use the system to review candidate profiles. The system may verify the manager's identity and role, granting broader access to candidate data. The compliance module may ensure that only permissible information is shared, while the memory management module may retrieve relevant candidate data from its various memory tiers.

Throughout these interactions, the system may continuously update its knowledge and refine its performance. The candidate scoring model within the recruitment module may adjust based on hiring outcomes, while the adaptive memory retention policy may optimize data storage based on usage patterns.

By integrating these modules, the system may provide a comprehensive solution for AI-driven interactions that prioritize compliance, data security, and user experience across various domains and use cases. The modular architecture may allow for flexibility and scalability, enabling the system to be adapted for different industries while maintaining a consistent framework for intelligent, compliant, and user-friendly AI interactions.

In an embodiment, the system may include a dynamic guard rail generation module that automatically creates and applies constraints to the AI persona in real-time. This module may work in conjunction with the hierarchical compliance and policy enforcement engine to ensure that the AI's behavior remains within appropriate boundaries for each specific role and interaction context.

The multimodal AI system may incorporate a dynamic guard rail generation module that automatically creates and applies constraints to the AI persona in real-time. This module works in conjunction with the hierarchical compliance and policy enforcement engine to ensure that the AI's behavior remains within appropriate boundaries for each specific role and interaction context. The dynamic guard rail generation module comprises several interconnected components that work together to analyze, synthesize, and enforce adaptive constraints on the AI's interactions.

A key component of the dynamic guard rail generation module is the role-based constraint analyzer. This analyzer evaluates the current user's role and access permissions to determine initial guard rail parameters. It interfaces with the compliance-driven data access control system to retrieve role-specific compliance profiles. These profiles may contain predefined sets of rules and restrictions based on regulatory requirements, corporate policies, and industry best practices. The analyzer uses natural language processing and machine learning techniques to interpret these profiles and translate them into actionable constraints for the AI persona.

Working alongside the role-based constraint analyzer is the interaction context evaluator. This component continuously assesses the ongoing conversation and user queries to identify potential sensitive topics or areas requiring additional safeguards. The evaluator utilizes advanced natural language processing techniques, including sentiment analysis, intent recognition, and topic modeling, to detect keywords, emotional states, and conversational themes that may trigger the need for more stringent guard rails. For instance, if the system detects that the conversation is veering towards sensitive financial information or personal health data, it may signal the need for additional protective measures.

The real-time guard rail synthesizer forms the core of the dynamic guard rail generation module. This component combines inputs from the role-based constraint analyzer and interaction context evaluator to generate a set of dynamic guard rails. These guard rails may be expressed as a complex set of rules, topic restrictions, or response templates that the AI must adhere to during the interaction. The synthesizer employs sophisticated algorithms to balance various factors, including user role, conversation context, compliance requirements, and potential risks. It may use techniques such as decision trees, fuzzy logic, or neural networks to determine the most appropriate set of constraints for each unique interaction scenario.

To ensure continuous compliance with the generated guard rails, the module incorporates an AI behavior monitor. This monitor tracks the AI's responses and actions in real-time, comparing them against the established guard rails. If a potential violation is detected, the monitor can intervene to modify or block the response before it is delivered to the user. The behavior monitor may employ advanced pattern recognition algorithms and semantic analysis to identify subtle deviations from the prescribed boundaries, ensuring a high level of precision in guard rail enforcement.

The guard rail adjustment mechanism adds a layer of adaptability to the system. This mechanism can dynamically modify the applied constraints based on changes in the interaction context or user behavior. It allows for the relaxation or tightening of guard rails as appropriate, ensuring a balance between safety and flexibility in AI interactions. The adjustment mechanism may use reinforcement learning techniques to optimize guard rail parameters over time, learning from successful interactions and user feedback to refine its decision-making process.

To illustrate the working of this dynamic guard rail system, consider a scenario where a financial advisor is using the AI system to assist with client consultations. When the advisor logs in, the role-based constraint analyzer identifies their role and retrieves the relevant compliance profile. This profile includes restrictions on providing specific investment advice without proper disclosures and limitations on discussing certain high-risk financial products.

As the conversation with a client progresses, the interaction context evaluator detects that the discussion is moving towards retirement planning. The real-time guard rail synthesizer combines this contextual information with the advisor's role-based constraints to generate a set of dynamic guard rails. These may include prompts for the AI to provide general educational information about retirement savings vehicles, but restrictions on recommending specific investment allocations without human oversight.

If the client inquires about a complex financial product, the AI behavior monitor ensures that the system's response includes appropriate risk disclosures and prompts for the advisor to assess the client's risk tolerance. Should the conversation drift towards topics outside the advisor's area of expertise or regulatory purview, the guard rail adjustment mechanism may tighten the constraints, limiting the AI's responses to general information and suggesting consultation with a specialist.

The integration of the dynamic guard rail generation module with other system components enhances its effectiveness and adaptability. For example, the module may work in tandem with the configurable AI memory management system to store and retrieve historical guard rail configurations. This integration allows the system to learn from past interactions and improve its guard rail generation over time.

Consider a scenario where the AI system is being used in a healthcare setting. A nurse practitioner logs in to use the system for patient consultations. The role-based constraint analyzer retrieves the compliance profile for nurse practitioners, which includes restrictions on diagnosing certain conditions and prescribing specific medications.

As the nurse practitioner interacts with the system to discuss a patient's symptoms, the interaction context evaluator recognizes that the conversation involves potential cardiac issues. The real-time guard rail synthesizer generates a set of constraints that allow the AI to provide general information about heart health and suggest relevant diagnostic tests, but restricts it from offering definitive diagnoses or treatment plans.

The AI behavior monitor ensures that all responses comply with these guard rails. If the nurse practitioner asks about a medication that's outside their prescribing authority, the monitor intervenes to modify the response, suggesting consultation with a physician instead.

Throughout the interaction, the guard rail adjustment mechanism fine-tunes the constraints based on the evolving conversation. If the nurse practitioner indicates that they're consulting with a cardiologist, the mechanism may slightly relax the guard rails to allow for more detailed discussion of cardiac conditions, while still maintaining appropriate boundaries.

The dynamic guard rail generation module also interfaces with the multimodal biometrics fusion system. As the biometrics system continuously verifies the user's identity throughout the session, it feeds this information to the guard rail module. If the identity confidence score drops below a certain threshold, the guard rail adjustment mechanism may immediately tighten the constraints, limiting access to sensitive information until identity is reconfirmed.

This integration of the dynamic guard rail system with other components creates a comprehensive, adaptive framework for maintaining appropriate boundaries and complying with role-specific regulations. By generating and applying guard rails in real-time, the system adapts to the nuances of each interaction, ensuring a safe and compliant user experience across various scenarios and user roles, while still providing personalized and context-aware assistance.

The multimodal AI system may incorporate a far-field recognition module that utilizes computer vision and machine learning techniques to identify and process images of individuals at a distance. This module may enhance the system's efficiency and expand its capabilities for applications such as attendance tracking.

The far-field recognition module may comprise a high-resolution camera capable of capturing clear images of individuals at extended distances. This camera may be coupled with a deep learning-based object detection and tracking system that can identify and follow multiple individuals simultaneously as they move within the camera's field of view.

To optimize energy efficiency, the far-field detection pipeline may execute on a dedicated low-power processor running a low-rate surveillance loop while the primary compute module remains in an idle state. This design reflects the energy-saving architecture already implemented in the system.

The module may employ a multi-stage neural network architecture for person detection and recognition. Initial stages may use lightweight models for quick filtering, with subsequent stages applying more complex models to regions likely to contain people, progressively increasing in complexity and accuracy as the person approaches the AI doll.

To optimize processing time and resource utilization, the system may implement a cascading classification approach integrated with the configurable AI memory management module. As initial identifications are made, relevant data may be preloaded into the short-term and mid-term memory tiers, facilitating faster access during final verification.

Just before a predicted arrival window, the system may both pre-load the relevant low-resolution embeddings into the transient identity index and temporarily lower the similarity threshold for those identities. The system may automatically revert these thresholds to their default values if no match occurs within the expected arrival window, ensuring a fail-safe mechanism is in place.

The far-field recognition module may interface with the multimodal biometrics fusion system, providing early identification hypotheses that can be refined as the person approaches. This early information may allow the biometrics system to pre-load relevant identity models and adjust its parameters, potentially reducing the time required for final identity verification.

For attendance tracking applications, the system may incorporate a temporal pattern analysis component. This component may utilize a temporal pattern learner to identify patterns in individuals' arrival times and frequencies. The system may learn to anticipate when specific individuals are likely to arrive, allowing it to proactively allocate computational resources for recognition during these time periods.

The attendance tracking functionality may be implemented using a combination of the far-field recognition module and the multimodal biometrics fusion system. As a person approaches, the far-field module may generate initial identity hypotheses. These hypotheses may be continuously refined using increasingly detailed visual information. Once the person is within range of the AI doll's other sensors, the full multimodal biometrics fusion process may be initiated for final identity confirmation.

An example implementation of this system in an office environment might proceed as follows: Based on learned temporal patterns, the system activates its far-field recognition module in anticipation of an arrival period. The camera detects a person entering the building at a distance. The initial lightweight model classifies the object as a person and initiates tracking. As the person moves closer, a more complex model generates initial identity hypotheses based on overall appearance and gait. The system cross-references these hypotheses with its database of expected arrivals for the current time period, further narrowing down potential identities. As the person continues to approach, facial features become discernible, and the system applies facial recognition algorithms to refine its hypotheses. When the person is in close proximity to the AI doll, the multimodal biometrics fusion system activates, capturing high-resolution facial images and preparing for voice input. The person greets the AI doll, triggering the voice recognition component. The system combines this with the refined visual data and the initial far-field hypotheses to make a final identity determination. Upon successful identification, the system logs the attendance record and may generate a personalized greeting or instructions based on the individual's role and schedule.

Throughout this process, the system adheres to strict privacy and compliance protocols as enforced by the hierarchical compliance and policy enforcement engine. All data collection, processing, and storage comply with relevant data protection regulations and corporate policies. The system may implement data minimization principles, only retaining necessary information for the required duration. Additionally, the compliance-driven data access control system ensures that only authorized personnel can access the collected attendance data and related personal information.

To further enhance privacy protection, raw distant frames are deleted immediately after vector embeddings are generated, so only embeddings are retained under the adaptive retention policy enforced by the compliance engine.

In some cases, the system may be utilized for an AI-driven recruitment process, showcasing the integration of various modules to streamline candidate screening, interviewing, and selection. This use case may demonstrate how the system's components work together to provide a comprehensive recruitment solution.

The process may begin when a candidate approaches the physical AI interface, which may be embodied as a "Maayu Doll" or a similar device. As the candidate nears, the multimodal biometrics fusion module may activate, capturing initial voice and facial data. The system may greet the candidate and begin a natural conversation, incrementally building confidence in the candidate's identity without overt identity checks.

During this initial interaction, the voice-first AI recruitment and workforce management module may take the lead. The module may access the job requirements and screening questions from the connected Human Resource Management System (HRMS). As the conversation progresses, the module may ask relevant screening questions, ensuring each query passes through the hierarchical compliance and policy enforcement module to maintain adherence to employment laws and company policies.

The candidate's responses may be processed in real-time by the candidate scoring model within the voice-first AI recruitment module. This model may analyze the semantic content of the answers, comparing them against job requirements and generating a preliminary suitability score.

Throughout the interaction, the configurable AI memory management module may be actively involved. The module may store the conversation in the short-term memory for immediate context, while also indexing key points in the mid-term memory for potential future reference. If the candidate mentions previous interactions with the company, the system may retrieve relevant information from the long-term memory store, subject to compliance checks.

As the screening progresses, the compliance-driven data access control module may regulate what information the system can access and share. For instance, while the system may have access to detailed salary information, the module may restrict the disclosure of such sensitive data during the initial screening.

If the candidate's preliminary score meets the required threshold, the voice-first AI recruitment module may proceed to schedule an interview with a human recruiter. The module may access the company's calendar system, propose available time slots to the candidate, and confirm the appointment.

Following the initial screening, a human recruiter may interact with the system to review the candidate's performance. The compliance-driven data access control module may now grant the recruiter access to more detailed candidate information, as appropriate for their role.

During the human-led interview, the recruiter may use the system to access relevant candidate information and suggested interview questions. The hierarchical compliance and policy enforcement module may continue to ensure all interactions adhere to relevant regulations and company policies.

After the interview, the recruiter may input their assessment into the system. The voice-first AI recruitment module's candidate scoring model may incorporate this feedback, refining its parameters for future screenings.

In the final selection stage, hiring managers may interact with the system to review candidate profiles. The compliance-driven data access control module may grant these users the highest level of access to candidate data, while still maintaining necessary privacy safeguards.

Throughout the entire process, the system may log all interactions and decisions in compliance with the audit requirements set by the hierarchical compliance and policy enforcement module. This comprehensive log may be available for review by authorized personnel, ensuring transparency and accountability in the recruitment process.

This use case demonstrates how the system's various modules may work in concert to provide a streamlined, compliant, and effective AI-driven recruitment process, from initial candidate screening to final selection.

In some cases, the system may be adapted for use in financial advising scenarios, demonstrating its versatility and compliance-focused design across different industries. The system may interact with users seeking financial advice while maintaining strict adherence to financial regulations and personalized data protection.

When a user approaches the physical AI interface for financial advice, the multimodal biometrics fusion module may initiate the identity verification process. The module may capture the user's voice and facial data simultaneously, adjusting the weighting of each modality based on the environmental conditions of the financial institution or advisory office.

Once the user's identity is confirmed, the compliance-driven data access control module may determine the user's role and associated access permissions. For a typical financial advice seeker, the module may set appropriate restrictions on accessing sensitive financial data of other clients or proprietary investment strategies.

The user may then pose a question about investment options. The voice-first module, now configured for financial advising, may process this query using natural language processing tailored to financial terminology and concepts. Before generating a response, the hierarchical compliance and policy enforcement module may check the query against multiple layers of financial regulations, including know-your-customer (KYC) rules, anti-money laundering (AML) regulations, and suitability requirements for investment advice.

The configurable AI memory management module may retrieve relevant information about the user's financial history, risk tolerance, and investment goals from its tiered memory architecture. In some cases, the module may access short-term memory for recent market updates, mid-term memory for the user's recent transactions, and long-term memory for historical investment performance data.

After ensuring compliance with financial regulations and retrieving relevant information, the system may generate a personalized investment recommendation. The compliance-driven data access control module may then filter this response to ensure it aligns with the user's authorization level and does not disclose any privileged information about other clients or the financial institution's internal strategies.

Throughout this interaction, the system may continuously update its knowledge base. The adaptive memory retention policy may optimize storage of financial data based on usage patterns and regulatory requirements for data retention in the financial industry.

In some cases, if the user inquires about a complex financial product, the system may recognize the need for additional verification of the user's understanding. The policy-aware question generation module may formulate follow-up questions to assess the user's financial literacy and risk awareness, ensuring compliance with regulations that require financial advisors to verify client comprehension of complex products.

The system may also adapt its communication style based on the user's preferences and financial sophistication level, as determined by previous interactions stored in the memory management module. For instance, for a user with limited financial knowledge, the system may use simpler terms and provide more explanations, while for an experienced investor, it may use more technical language and offer more detailed market analysis.

In the event that the user requests information about a financial product that may not be suitable for their risk profile or financial situation, the hierarchical compliance and policy enforcement module may intervene. The module may either rephrase the response to focus on more appropriate options or provide a compliance-mandated warning about the risks associated with the requested product.

By integrating these modules in a financial advising context, the system may provide personalized, compliant financial advice while maintaining data security and adapting to individual user needs. This use case demonstrates the system's ability to navigate complex regulatory environments while delivering user-friendly AI-driven interactions in sensitive domains like financial services.

The multimodal AI system incorporates advanced neural network architectures across its various modules to achieve high levels of performance, adaptability, and compliance. These architectures form the backbone of a sophisticated AI system capable of handling diverse tasks while maintaining strict adherence to compliance and security protocols.

In an embodiment, the configurable AI memory management module may utilize a hierarchical neural network architecture. The architecture may comprise an input layer, multiple hidden layers, and an output layer. The input layer may contain nodes corresponding to various features of the user query and conversation context. The hidden layers may include multiple attention mechanisms to focus on relevant parts of the input and memory stores. The output layer may produce relevance scores for different memory segments.

The architecture may incorporate three parallel pathways corresponding to short-term, mid-term, and long-term memory stores. Each pathway may consist of 3-5 hidden layers with 64-256 nodes per layer. The short-term memory pathway may use recurrent neural network (RNN) layers to capture temporal dependencies in recent conversations. The mid-term and long-term memory pathways may employ transformer layers to process longer sequences of historical data.

A fusion layer may combine the outputs of these pathways, using a gating mechanism to dynamically weight the importance of each memory store based on the current context. The final hidden layer may use residual connections to preserve important low-level features. The output layer may employ a softmax activation function to produce probability distributions over memory segments for retrieval.

For the hierarchical compliance and policy enforcement engine:

In an embodiment, the hierarchical compliance and policy enforcement engine may employ a multi-task learning architecture. The base of the architecture may consist of a shared encoder with 6-8 transformer layers, each containing 512-1024 nodes. This shared encoder may process input text and extract general features relevant to compliance checking.

On top of the shared encoder, the architecture may branch into three task-specific heads corresponding to user-level rules, corporate policies, and government regulations. Each head may comprise 2-3 feed-forward layers with 128-256 nodes per layer. These task-specific layers may fine-tune the shared representations for their respective compliance domains.

The architecture may incorporate skip connections between the shared encoder and task-specific heads to preserve low-level features that may be crucial for certain compliance checks. The output of each head may use sigmoid activation to produce compliance scores for different rule categories.

A final decision layer may combine the outputs of all heads, using an attention mechanism to weight the importance of different compliance aspects based on the current context. This layer may output a final compliance score and identify specific rules or policies that require attention.

For the compliance-driven data access control module:

In an embodiment, the compliance-driven data access control module may utilize a graph neural network (GNN) architecture. The input to the GNN may be a graph representation of the user's role, permissions, and relevant data categories.

The GNN may consist of 3-5 graph convolutional layers, each with 64-128 nodes. These layers may propagate information along the edges of the graph, allowing the model to capture complex relationships between roles, permissions, and data categories.

After the graph convolutional layers, the architecture may incorporate a pooling layer to aggregate node-level features into a graph-level representation. This may be followed by 2-3 feed-forward layers with 128-256 nodes each, which may process the graph-level features to make final access control decisions.

The output layer may use multi-label classification to determine which specific data categories and operations are permitted for the current user and context. Additionally, the architecture may include an auxiliary output that predicts the confidence level of its access control decisions, allowing for human intervention in uncertain cases.

In an embodiment, the voice-first AI recruitment and workforce management module may employ a hybrid architecture combining convolutional neural networks (CNNs) and long short-term memory (LSTM) networks.

The input layer may process both textual and audio features of the candidate's responses. For textual input, an embedding layer may convert words into dense vector representations. For audio input, a series of 1D convolutional layers (3-5 layers with 64-128 filters each) may extract relevant acoustic features.

The textual and acoustic features may then be fed into separate LSTM layers (2-3 layers with 128-256 units each) to capture temporal dependencies in the candidate's responses. The outputs of these LSTM layers may be concatenated and passed through a series of 2-3 feed-forward layers (128-256 nodes each) for further processing.

The architecture may incorporate an attention mechanism that allows the model to focus on the most relevant parts of the candidate's responses when making assessments. The output layer may use multiple nodes with sigmoid activation to score the candidate on various job-relevant dimensions.

An additional branch in the architecture may focus on question generation. This branch may take the current conversation context and job requirements as input and use a sequence-to-sequence model with 4-6 transformer layers (512-1024 nodes each) to generate relevant follow-up questions.

In an embodiment, the multimodal biometrics fusion module may utilize a two-stream architecture with late fusion. One stream may process voice data, while the other processes facial data.

The voice stream may start with a series of 1D convolutional layers (4-6 layers with 64-128 filters each) to extract spectral features from the audio input. These may be followed by 2-3 LSTM layers (128-256 units each) to capture temporal dynamics in the voice.

The facial stream may use a deep CNN architecture, such as ResNet-50 or EfficientNet-B4, pretrained on large-scale face recognition datasets and fine-tuned for this specific task. This stream may process sequences of video frames to capture both spatial and temporal facial features.

The outputs of both streams may be combined using a fusion layer that concatenates the feature vectors and applies self-attention to weight the importance of different modalities. This fused representation may then be passed through 2-3 feed-forward layers (256-512 nodes each) for final processing.

The output layer may produce an identity confidence score using sigmoid activation. Additionally, the architecture may include auxiliary outputs that predict the reliability of each modality, allowing the system to adaptively weight voice and facial information based on environmental conditions.

In an embodiment, the dynamic guard rail generation module may employ a meta-learning architecture to generate adaptive constraints. The base of the architecture may consist of a large language model, such as GPT-3 or a similar transformer-based model, with 12-24 transformer layers (1024-4096 nodes each).

On top of this base model, a meta-learning layer may be implemented using Model-Agnostic Meta-Learning (MAML) or a similar algorithm. This layer may allow the model to quickly adapt to different roles and contexts with minimal fine-tuning.

The architecture may incorporate a context encoding branch that processes the current interaction context, user role, and applicable compliance rules. This branch may use 3-5 transformer layers (512-1024 nodes each) to generate a context embedding.

The main branch of the architecture may take the context embedding and generate guard rail parameters. This may involve 4-6 feed-forward layers (256-512 nodes each) with residual connections. The output layer may produce multiple values corresponding to different types of constraints (e.g., topic restrictions, response templates, confidence thresholds).

An additional reinforcement learning component may be integrated into the architecture. This component may use a policy gradient method to optimize the guard rail parameters based on feedback from the AI behavior monitor. The policy network may consist of 2-3 layers (128-256 nodes each) and output actions to adjust the guard rail parameters.

The multimodal AI system 100 may include a physical AI interface 102, which may serve as the primary interaction point with the environment. The physical AI interface 102 may include a sensor suite 104 comprising multiple sensing components. In some cases, the sensor suite 104 may include a camera 106, a multi-microphone array 108, and environmental sensors 110. These components of the sensor suite 104 may collect various types of data from the surrounding environment.

The multimodal AI system 100 may also include an embedded compute module 112, which may process the data collected by the sensor suite 104. In some cases, the embedded compute module 112 may be connected to the sensor suite 104, enabling direct data transfer between these components.

An edge connectivity component 114 may be included in the multimodal AI system 100. The edge connectivity component 114 may be connected to the embedded compute module 112, potentially enabling communication with external systems or networks. In some cases, the edge connectivity component 114 may facilitate communication with remote AI servers 116.

The multimodal AI system 100 may include a voice-face embedding fusion engine. This engine may combine voice data captured by the multi-microphone array 108 and facial data captured by the camera 106 for identity verification purposes. By fusing these different modalities, the system may achieve more robust and accurate identity verification.

In some cases, the physical AI interface 102 may include a beamforming DSP module. This module may enhance voice signal clarity by processing the audio input from the multi-microphone array 108. The beamforming DSP module may help isolate and amplify the primary speaker's voice while suppressing background noise, potentially improving the accuracy of voice-based interactions and identity verification.

The multimodal AI system 100 may incorporate an incremental confidence building mechanism for identity verification. This mechanism may operate through natural conversation flow, gradually gathering and analyzing voice and facial data without explicitly prompting the user for identification. As the conversation progresses, the system may incrementally increase its confidence in the user's identity based on the accumulated multimodal data.

The multimodal AI system 100 may operate by collecting environmental data through the sensor suite 104, processing this data locally in the embedded compute module 112, and potentially sharing or receiving additional processing capabilities from the remote AI servers 116 through the edge connectivity component 114. This architecture may allow for a combination of local and remote processing, enabling the system to handle complex AI tasks while maintaining a physical presence in the environment.

Figure 2:
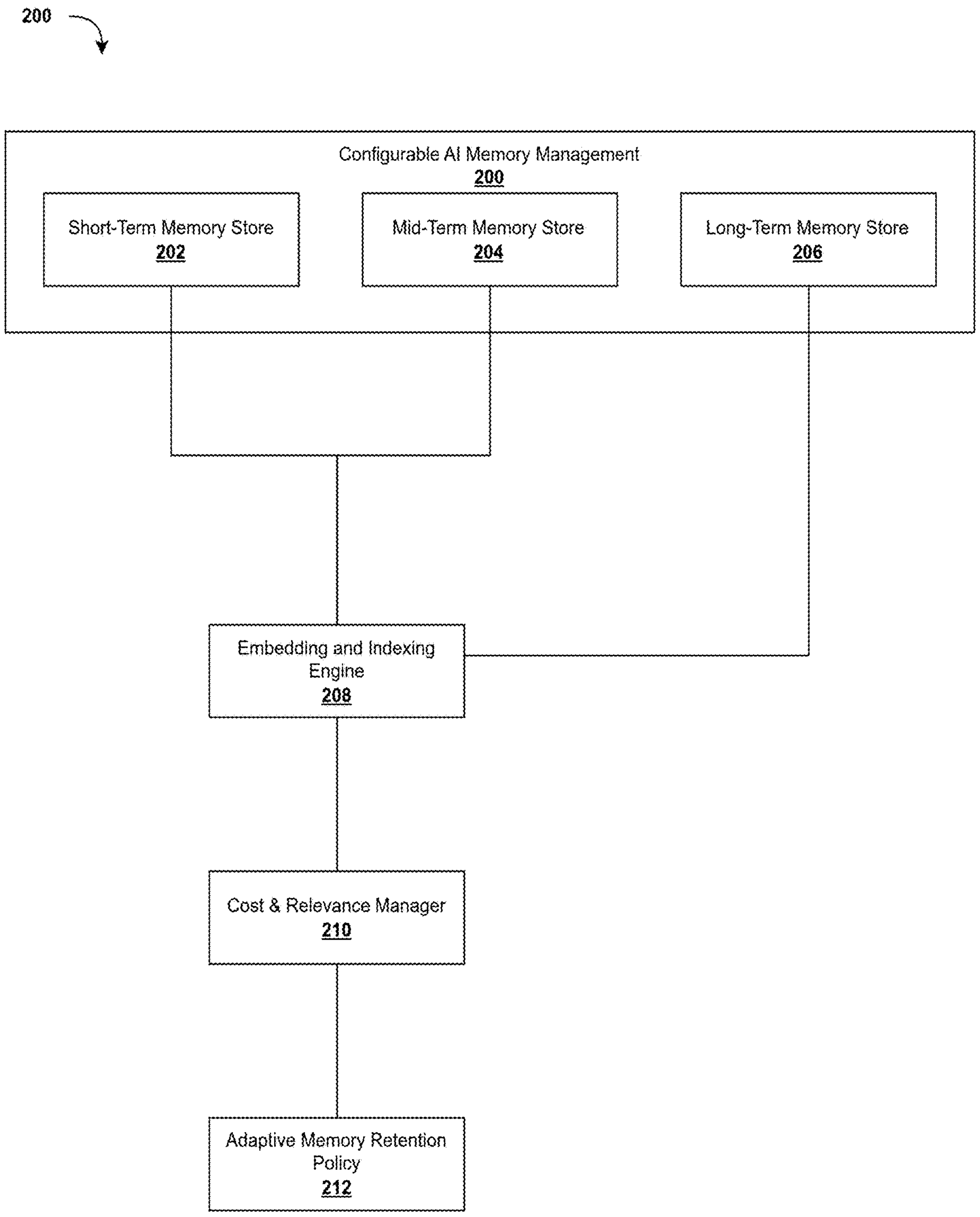
FIG. 2 depicts a system diagram of a configurable AI memory management architecture, in accordance with example embodiments.

The multimodal AI system 100 may include a configurable AI memory management component 200, as illustrated in FIG. 2. The configurable AI memory management component 200 may encompass multiple memory stores and associated processing modules to manage information across different temporal scales.

The configurable AI memory management component 200 may comprise a short-term memory store 202, a mid-term memory store 204, and a long-term memory store 206. These memory stores may hold data for varying durations, allowing the system to retain and access information over different time periods.

In some cases, the short-term memory store 202 may hold the most recent exchanges directly relevant to a user's current query. The mid-term memory store 204 may keep selected recent sessions or topics that are likely to recur within a set time window. The long-term memory store 206 may maintain compressed or index-based historical data accessible via embedding-based search.

The configurable AI memory management component 200 may include an embedding and indexing engine 208. The embedding and indexing engine 208 may process and organize the stored information across the different memory stores. In some cases, the embedding and indexing engine 208 may convert historical conversation segments into vector embeddings, allowing for fast retrieval of semantically similar segments from the mid-term memory store 204 and long-term memory store 206.

A cost & relevance manager 210 may be included in the configurable AI memory management component 200. The cost & relevance manager 210 may evaluate the importance and resource requirements of stored data. In some cases, the cost & relevance manager 210 may score each memory candidate segment against a user's current query and estimate computational or financial costs associated with retrieving additional historical segments.

The configurable AI memory management component 200 may also include an adaptive memory retention policy component 212. The adaptive memory retention policy component 212 may determine how information is retained or discarded across the different memory stores. In some cases, the adaptive memory retention policy component 212 may include a usage analytics module for tracking retrieval frequency and user patterns. This module may monitor how often certain data is accessed and adjust retention policies accordingly.

The embedding and indexing engine 208, cost & relevance manager 210, and adaptive memory retention policy component 212 may work together to manage information across different temporal scales. For example, the embedding and indexing engine 208 may process information from all memory stores, creating structured representations that can be efficiently accessed and analyzed. The cost & relevance manager 210 may then assess the value and resource implications of this stored data, informing the adaptive memory retention policy component 212. Based on this information and the usage analytics, the adaptive memory retention policy component 212 may make decisions about data retention, potentially moving information between memory stores or removing less relevant data.

In some cases, the configurable AI memory management component 200 may enable dynamic management of AI memory resources, balancing information retention with system efficiency. The component may utilize standardized interfaces between its subcomponents, potentially allowing for modular design and scalability.

Figure 3:
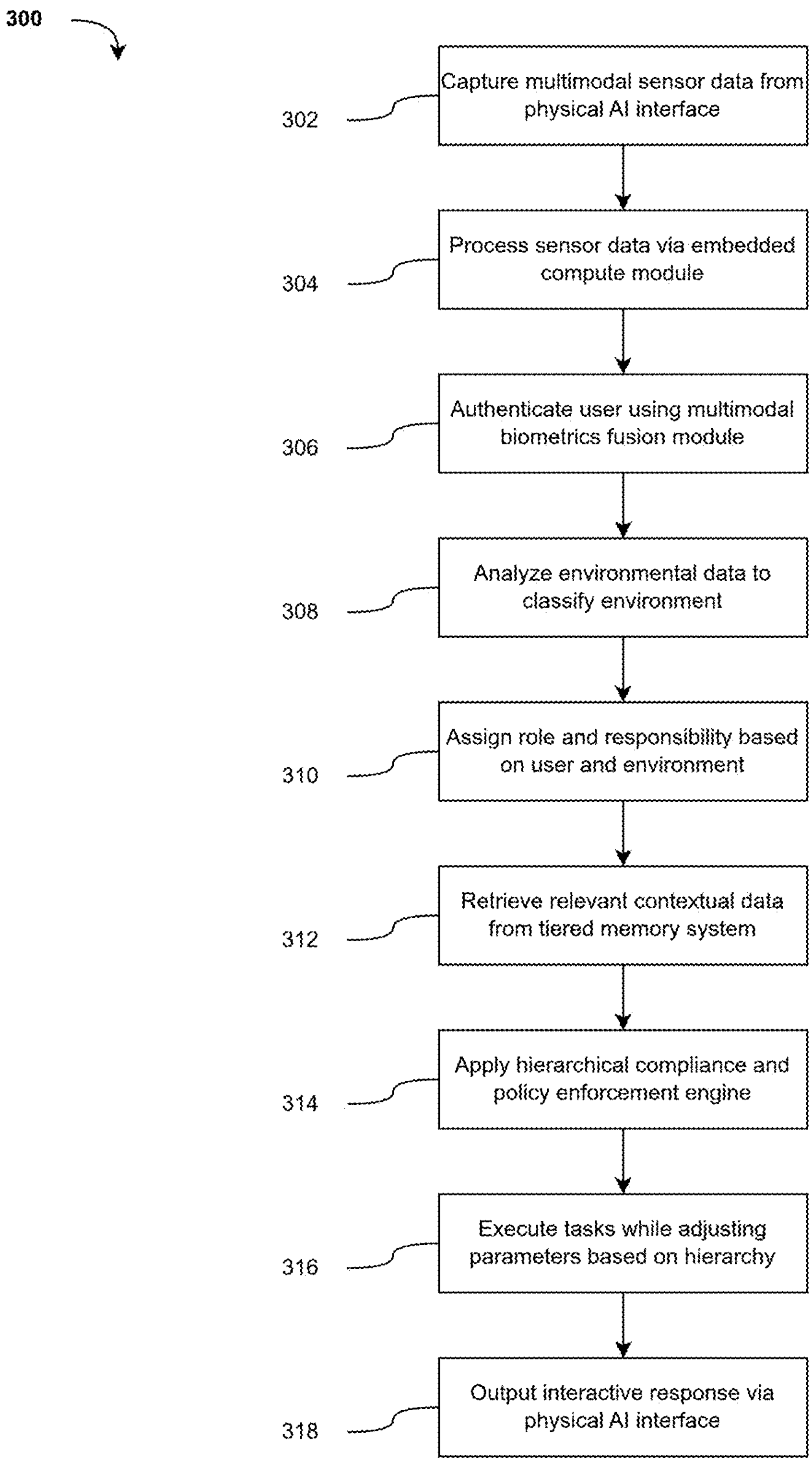
FIG. 3 shows a flowchart for an adaptive interaction and task execution method in a multimodal AI system, according to an embodiment.

The multimodal AI system 100 may implement an adaptive interaction and task execution method, as illustrated in FIG. 3. This method may involve a series of steps that enable the system to process multimodal inputs, authenticate users, classify environments, and execute tasks based on contextual information and compliance rules.

The method may begin with a step 300 of capturing multimodal sensor data from the physical AI interface 102. In some cases, this step may involve collecting data from the sensor suite 104, which may include inputs from the camera 106, the multi-microphone array 108, and the environmental sensors 110.

Following the data capture, the method may proceed to a step 302 of processing the sensor data via the embedded compute module 112. This processing step may involve initial data analysis and preparation for subsequent steps in the method.

The method may then move to a step 304 of authenticating the user using a multimodal biometrics fusion module. This authentication step may combine data from multiple sensors, such as voice data from the multi-microphone array 108 and facial data from the camera 106, to verify the user's identity.

After user authentication, the method may include a step 306 of analyzing environmental data to classify the environment. This step may utilize data from the environmental sensors 110 to determine the context in which the interaction is taking place.

Based on the authenticated user and classified environment, the method may proceed to a step 308 of assigning a role and responsibility. This assignment may determine how the system interacts with the user and what tasks it may perform.

The method may then include a step 310 of retrieving relevant contextual data from a tiered memory system. This step may involve accessing information from the short-term memory store 202, the mid-term memory store 204, or the long-term memory store 206 of the configurable AI memory management component 200, depending on the assigned role and the nature of the interaction.

Following data retrieval, the method may incorporate a step 312 of applying a hierarchical compliance and policy enforcement engine. This step may ensure that the system's actions adhere to predefined rules and policies at various levels of the hierarchy.

The method may then proceed to a step 314 of executing tasks while adjusting parameters based on the established hierarchy. This step may involve performing actions or generating responses that are appropriate for the assigned role and compliant with the applicable rules.

Finally, the method may conclude with a step 316 of outputting an interactive response via the physical AI interface 102. This output may be in the form of spoken language, visual display, or other modalities supported by the physical AI interface 102.

In some cases, this adaptive interaction and task execution method may enable the multimodal AI system 100 to provide context-aware, compliant, and personalized interactions with users. The method may leverage the system's multimodal sensing capabilities, tiered memory architecture, and hierarchical compliance mechanisms to deliver appropriate responses and actions based on the specific user, environment, and interaction context.

Figure 4:
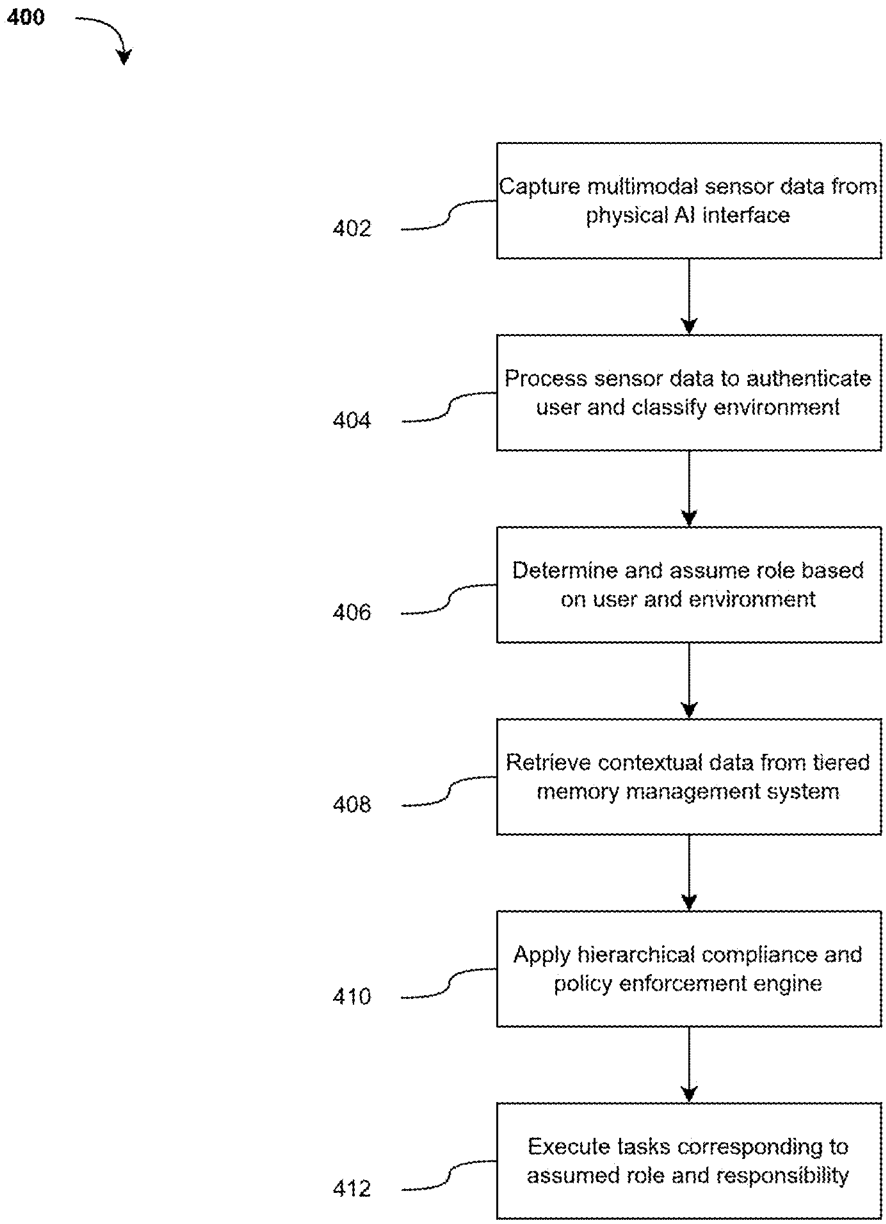
FIG. 4 illustrates a flowchart for an adaptive interaction process in a multimodal AI system, according to aspects of the present disclosure.

The multimodal AI system 100 may implement a simplified adaptive interaction process, as illustrated in FIG. 4. This process may involve a series of steps that enable the system to process multimodal inputs, authenticate users, classify environments, determine roles, retrieve contextual data, apply compliance rules, and execute tasks.

The process may begin with a step 400 of capturing multimodal sensor data from the physical AI interface 102. In some cases, this step may involve collecting data from the sensor suite 104, which may include inputs from the camera 106, the multi-microphone array 108, and the environmental sensors 110.

Following the data capture, the process may proceed to a step 402 of processing the sensor data to authenticate the user and classify the environment. This step may combine the functions of user authentication and environment classification into a single operation. The embedded compute module 112 may perform this processing, potentially utilizing data from multiple sensors to verify the user's identity and determine the context of the interaction.

The process may then move to a step 404 of determining and assuming a role based on the authenticated user and classified environment. This step may involve assigning appropriate responsibilities and access levels to the system based on the specific user and the context in which the interaction is taking place.

After role determination, the process may include a step 406 of retrieving contextual data from a tiered memory management system. This step may involve accessing information from the short-term memory store 202, the mid-term memory store 204, or the long-term memory store 206 of the configurable AI memory management component 200, depending on the assumed role and the nature of the interaction.

The process may then incorporate a step 408 of applying a hierarchical compliance and policy enforcement engine. This step may ensure that the system's actions adhere to predefined rules and policies at various levels of the hierarchy, based on the assumed role and retrieved contextual data.

Finally, the process may conclude with a step 410 of executing tasks corresponding to the assumed role and responsibility. This step may involve performing actions or generating responses that are appropriate for the determined role and compliant with the applicable rules.

In some cases, this simplified adaptive interaction process may enable the multimodal AI system 100 to provide context-aware, compliant, and personalized interactions with users in a more streamlined manner. The process may leverage the system's multimodal sensing capabilities, tiered memory architecture, and hierarchical compliance mechanisms to deliver appropriate responses and actions based on the specific user, environment, and interaction context.

Figure 5:
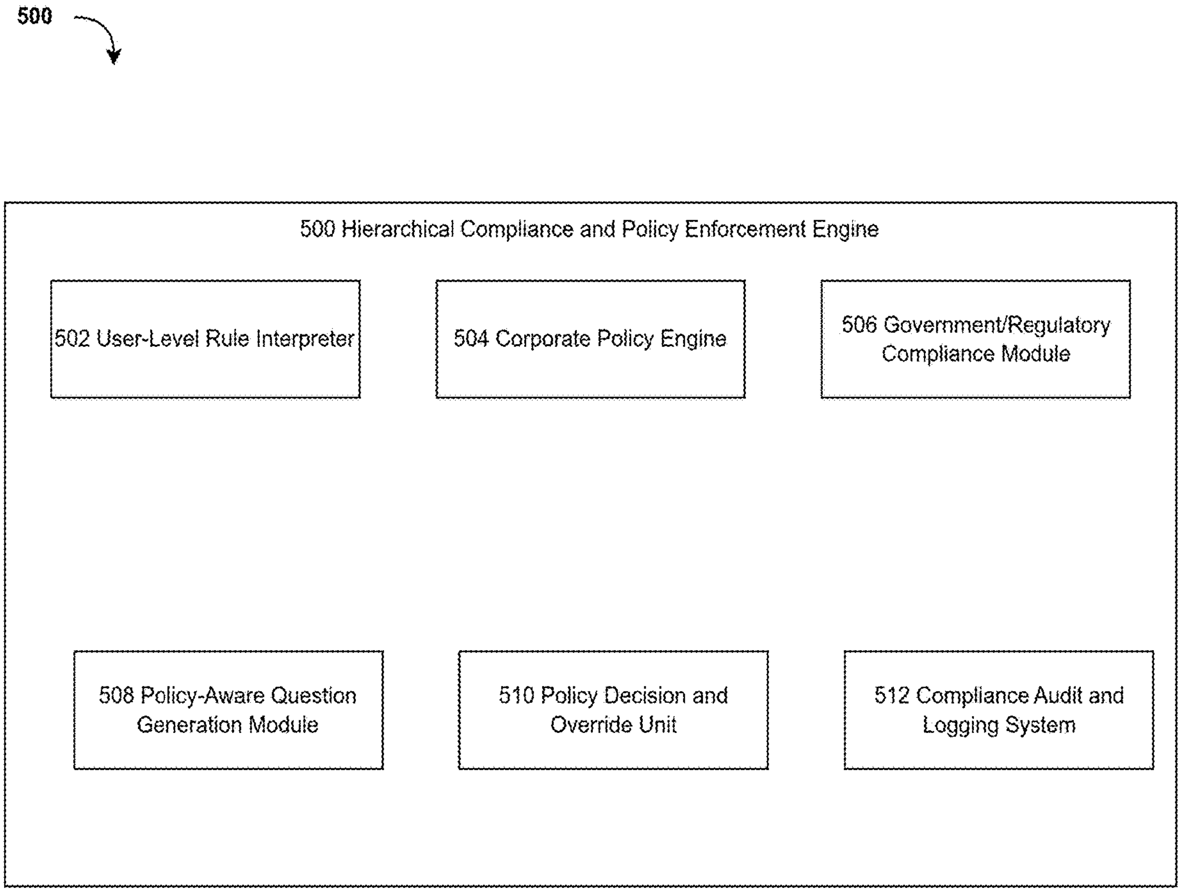
FIG. 5 depicts a hierarchical compliance and policy enforcement engine, in accordance with example embodiments.

The multimodal AI system 100 may include a hierarchical compliance and policy enforcement engine 500, as illustrated in FIG. 5. The hierarchical compliance and policy enforcement engine 500 may comprise several components that work together to ensure adherence to various levels of rules, policies, and regulations.

In some cases, the hierarchical compliance and policy enforcement engine 500 may include a user-level rule interpreter 502. The user-level rule interpreter 502 may process immediate user instructions against basic filters. For example, the user-level rule interpreter 502 may check for profanity or disallowed queries before passing the input to other components of the system.

The hierarchical compliance and policy enforcement engine 500 may also comprise a corporate policy engine 504. The corporate policy engine 504 may integrate a corporate policies rulebase, which may be accessible through a knowledge graph or rules engine. This component may ensure that interactions and decisions made by the multimodal AI system 100 align with internal organizational policies.

A government/regulatory compliance module 506 may be included in the hierarchical compliance and policy enforcement engine 500. The government/regulatory compliance module 506 may apply jurisdiction-specific regulations to the system's operations. In some cases, the government/regulatory compliance module 506 may use predefined legal frameworks stored in a compliance database to ensure adherence to relevant laws and regulations.

The hierarchical compliance and policy enforcement engine 500 may incorporate a policy-aware question generation module 508. The policy-aware question generation module 508 may integrate a language model configured to create questions on demand. Before finalizing a generated question, the policy-aware question generation module 508 may check it against the hierarchical compliance rules. If a question violates any restriction, the policy-aware question generation module 508 may automatically rephrase or replace it until it meets all compliance criteria.

A policy decision and override unit 510 may be part of the hierarchical compliance and policy enforcement engine 500. The policy decision and override unit 510 may include a semantic parser for converting user requests into structured representations. These structured representations may then be evaluated against layered rule sets. In some cases, if a request violates rules, the policy decision and override unit 510 may either deny it or reformulate the query into a compliant version before passing it to other components of the multimodal AI system 100.

The hierarchical compliance and policy enforcement engine 500 may also include a compliance audit and logging system 512. The compliance audit and logging system 512 may store each decision made by the engine, the rules triggered, and the final action taken. In some cases, the compliance audit and logging system 512 may provide an internal dashboard for compliance officers or administrators to review historical compliance decisions.

By incorporating these components, the hierarchical compliance and policy enforcement engine 500 may enable the multimodal AI system 100 to operate within defined legal, corporate, and ethical boundaries while maintaining flexibility in its interactions and decision-making processes.

Figure 6:
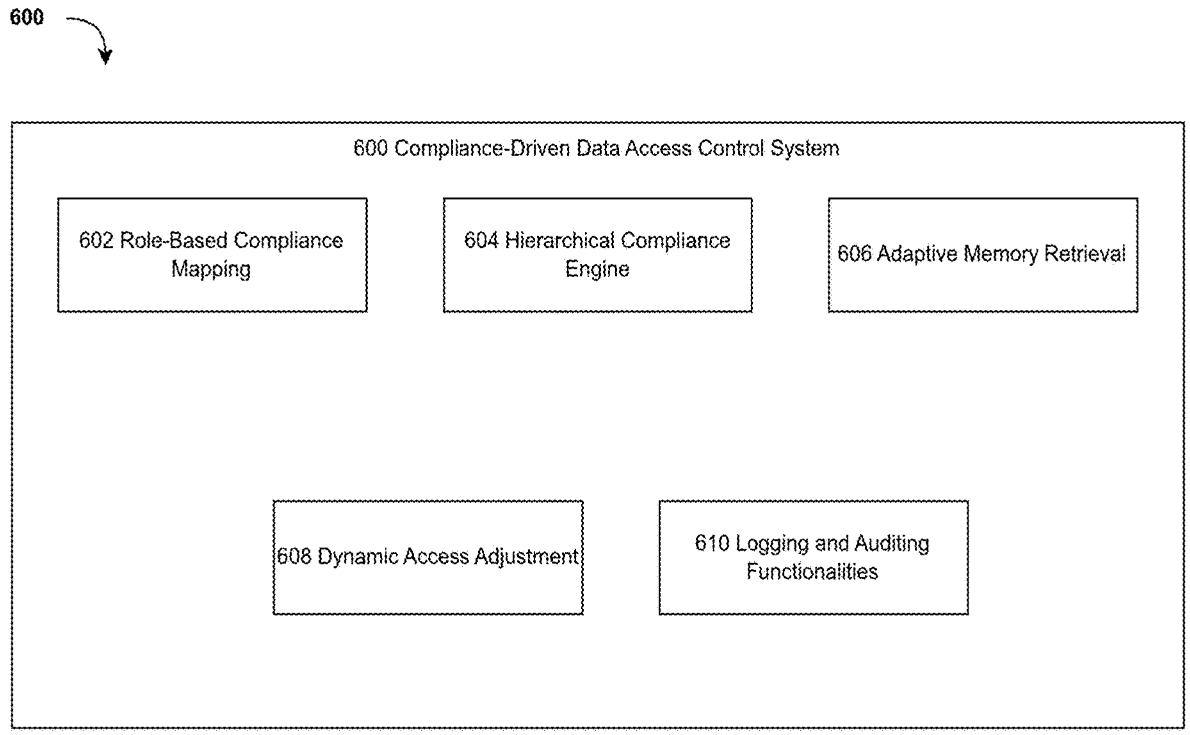
FIG. 6 shows a compliance-driven data access control system, according to an aspect of the present disclosure.

The multimodal AI system 100 may include a compliance-driven data access control system 600, as illustrated in FIG. 6. The compliance-driven data access control system 600 may comprise several components that work together to manage data access based on user roles, compliance requirements, and dynamic adjustments.

In some cases, the compliance-driven data access control system 600 may include a role-based compliance mapping component 602. The role-based compliance mapping component 602 may associate user roles with specific compliance profiles. These compliance profiles may dictate what categories of data can be retrieved from the short-term memory store 202, the mid-term memory store 204, or the long-term memory store 206 of the configurable AI memory management component 200.

The compliance-driven data access control system 600 may also comprise a hierarchical compliance engine 604. The hierarchical compliance engine 604 may evaluate user roles, corporate policies, and government regulations to determine the permissible data retrieval depth. In some cases, the hierarchical compliance engine 604 may dynamically adjust retrieval parameters based on the specific user role and applicable compliance rules.

An adaptive memory retrieval component 606 may be included in the compliance-driven data access control system 600. The adaptive memory retrieval component 606 may selectively pull data from various memory stores based on the compliance results determined by the hierarchical compliance engine 604. For example, high-trust roles with strong compliance clearance may be granted access to historical data from the long-term memory store 206, while lower-trust roles may be limited to data from the short-term memory store 202 only.

The compliance-driven data access control system 600 may incorporate a dynamic access adjustment component 608. The dynamic access adjustment component 608 may include a dynamic retrieval controller for evaluating user queries against role-based constraints. This controller may check if requested historical details are allowed given the user's compliance parameters and either retrieve the authorized data or return a restricted, compliance-friendly response.

A logging and auditing functionalities component 610 may be part of the compliance-driven data access control system 600. The logging and auditing functionalities component 610 may record data access activities, compliance decisions, and any adjustments made by the dynamic access adjustment component 608. These logs may be used for auditing purposes and to ensure ongoing compliance with relevant policies and regulations.

In some cases, the multimodal AI system 100 may include a recruitment persona configuration. This configuration may comprise candidate screening and scheduling modules. The candidate screening module may use predefined question templates and job requirement repositories to evaluate potential candidates. The scheduling module may integrate with HR systems for managing interviews and reminders.

The multimodal AI system 100 may also incorporate a candidate scoring model. This model may analyze candidate answers for semantic alignment with job requirements. In some cases, the candidate scoring model may generate suitability scores based on the candidates'responses. The model may refine its scoring over time based on real hiring outcomes, potentially improving the accuracy of candidate evaluations.

By incorporating these components and functionalities, the compliance-driven data access control system 600 may enable the multimodal AI system 100 to manage data access in a way that is responsive to user roles, compliant with relevant policies and regulations, and adaptable to changing requirements or contexts.

Figure 7:
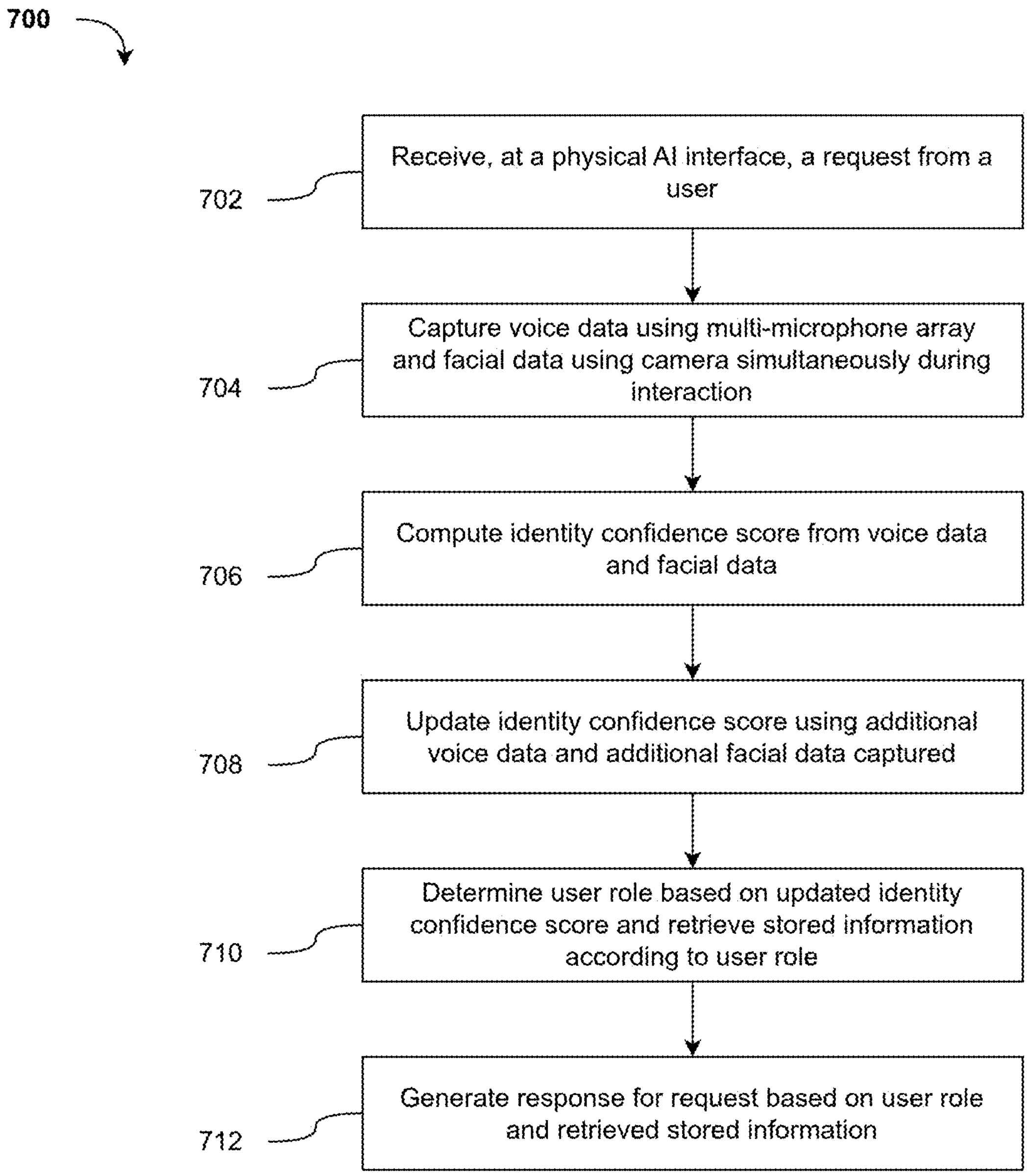
FIG. 7 illustrates a flowchart for a method for processing user requests with multimodal identity verification and role-based response generation, according to aspects of the present disclosure.

The multimodal AI system 100 may implement a method 700 for processing user requests at a physical AI interface with multimodal identity verification and role-based response generation, as illustrated in FIG. 7. The method 700 may involve a series of steps that enable the system to capture multimodal biometric data, incrementally verify user identity, determine appropriate access levels, and generate compliant responses.

The method 700 may begin with a step 702 of receiving, at a physical AI interface, a request from a user. In some cases, this step may involve the physical AI interface 102 detecting and accepting an initial query or command from a user seeking to interact with the system.

Following the request reception, the method 700 may proceed to a step 704 of capturing voice data using a multi-microphone array and capturing facial data using a camera simultaneously during the interaction. This step may involve the multi-microphone array 108 recording audio input from the user while the camera 106 captures visual data of the user's face. The simultaneous capture of both modalities may enable the system to gather complementary biometric information during natural conversation.

The method 700 may then move to a step 706 of computing an identity confidence score from the voice data and the facial data. In some cases, this step may involve generating embeddings from both the voice and facial data and fusing these embeddings to produce a combined confidence score representing the likelihood that the user matches a known identity.

After computing the initial identity confidence score, the method 700 may include a step 708 of updating the identity confidence score using additional voice data and additional facial data captured during the ongoing interaction. This step may involve incrementally refining the confidence score as the conversation progresses, potentially allowing the system to achieve higher confidence levels through natural dialogue without requiring explicit authentication prompts.

The method 700 may then advance to a step 710 of determining a user role based on the updated identity confidence score and retrieving stored information according to the user role. This step may involve associating the verified user identity with a hierarchical role structure and accessing appropriate data from the tiered memory system based on the determined role's access permissions.

Finally, the method 700 may conclude with a step 712 of generating a response for the request based on the user role and the retrieved stored information. This step may involve producing an output that is tailored to the user's identity, role-based permissions, and the contextual information retrieved from the memory stores.

A number of implementations have been described. Nevertheless, it will be understood that various modifications may be made without departing from the spirit and scope of the disclosure.

I claim:

1. A computer-implemented method comprising:

receiving, at a physical Artificial Intelligence (AI) interface, a request from a user;

capturing voice data of the user using a multi-microphone array of the physical AI interface and capturing facial data of the user using a camera of the physical AI interface simultaneously during an interaction;

computing an identity confidence score from the voice data and the facial data;

updating the identity confidence score using additional voice data and additional facial data captured;

determining a user role for the user based on the updated identity confidence score, and retrieving stored information for the request according to the user role;

generating a response for the request based on the user role and the retrieved stored information, wherein updating the identity confidence score comprises processing a time-ordered sequence of voice embeddings and face embeddings using a long short-term memory network, and wherein updating the identity confidence score comprises:

improving the identity confidence score responsive to determining that the identity confidence score is below a threshold by:

selecting a follow-up question from a set of prompts to continue the interaction;

capturing the additional voice data and the additional facial data responsive to the follow-up question; and thereby, improving the identity confidence score.

2. The method of claim 1, wherein capturing the voice data comprises processing microphone input using beamforming digital signal processing to enhance a primary speaker voice and suppress background noise.

3. The method of claim 1, wherein computing the identity confidence score comprises generating a voice embedding from the voice data, generating a face embedding from the facial data, and fusing the voice embedding and the face embedding, wherein fusing comprises weighting the voice embedding based on ambient noise, and weighting the face embedding based on ambient lighting.

4. The method of claim 1, wherein the set of prompts comprises predefined contextually relevant prompts stored in a memory of the physical AI interface.

5. The method of claim 1, wherein determining the user role comprises associating a confirmed user identity with a hierarchical role structure.

6. The method of claim 1, wherein retrieving the stored information comprises selecting a compliance profile corresponding to the user role;

determining a permissible data retrieval depth based on the compliance profile; and retrieving the stored information in accordance with the permissible data retrieval depth.

7. The method of claim 1, further comprising converting interaction segments into vector embeddings and storing the vector embeddings in a vector database comprising a vector index, wherein retrieving the stored information for the request comprises using the vector index to select and retrieve interaction segments based on semantic relevance to the request for generating the response.

8. The method of claim 7, further comprising retrieving context for the request by checking the memory for relevant interaction segments and searching the vector index for semantically similar interaction segments stored in a mid-term memory store and a long-term memory store based on the context to identify candidate interaction segments.

9. The method of claim 8, further comprising calculating a relevance score for the candidate interaction segments relative to the request, calculating a retrieval cost associated with retrieving additional interaction segments, and selecting retrieved interaction segments using the relevance score and the retrieval cost.

10. The method of claim 8, further comprising generating guardrail constraints based on the user role and the context.

11. The method of claim 10, further comprising comparing a candidate response to the guardrail constraints before generating the response.

12. The method of claim 11, further comprising modifying the candidate response responsive to detecting a violation of the guardrail constraints.

13. The method of claim 1, further comprising converting the request into a structured semantic representation and evaluating the structured semantic representation against layered rule sets before generating the response.

14. The method of claim 13, further comprising reformulating the request into a compliant form before generating the response based on the evaluation.

15. The method of claim 13, further comprising recording a compliance decision in a logging database.

16. A system comprising a physical Artificial Intelligence (AI) interface including a multi-microphone array and a camera, one or more processors, and a non-transitory computer-readable memory storing instructions that, when executed by the one or more processors, cause the system to:

receive, at a physical AI interface, a request from a user;

capture voice data of the user using a multi-microphone array of the physical AI interface and capturing facial data of the user using a camera of the physical AI interface simultaneously during an interaction;

compute an identity confidence score from the voice data and the facial data;

improve the identity confidence score using additional voice data and additional facial data captured;

determine a user role for the user based on the improved identity confidence score, and retrieving stored information for the request according to the user role;

generate a response for the request based on the user role and the retrieved stored information, wherein updating the identity confidence score comprises processing a time-ordered sequence of voice embeddings and face embeddings using a long short-term memory network, and wherein updating the identity confidence score comprises:

improving the identity confidence score responsive to determining that the identity confidence score is below a threshold by:

selecting a follow-up question from a set of prompts to continue the interaction;

capturing the additional voice data and the additional facial data responsive to the follow-up question; and thereby, improving the identity confidence score.

17. The system of claim 16, wherein the physical AI interface comprises a beamforming digital signal processing module configured to process microphone input to enhance a primary speaker voice and suppress background noise.

18. The system of claim 16, further comprising a configurable AI memory management module that maintains a tiered memory architecture comprising a short-term memory store, a mid-term memory store, and a long-term memory store, and includes an embedding and indexing engine that converts interaction segments into vector embeddings and maintains a vector database comprising a vector index.

19. The system of claim 18, wherein the configurable AI memory management module includes a cost and relevance manager comprising a relevance scoring module configured to score candidate segments against a current request and a cost function evaluator configured to compute a computational cost value associated with retrieving additional segments, and wherein the cost and relevance manager selects a retrieved set of segments based on the scores and the computational cost value.

20. The system of claim 16, wherein an AI behavior monitor detects violations of dynamic guard rails using semantic analysis of the candidate response.

21. The system of claim 16, wherein a guard rail adjustment mechanism updates the parameters of the dynamic guard rails using reinforcement learning based on prior interactions and user feedback.

* * * * *